(12) United States Patent
Karaki et al.

(10) Patent No.: US 12,279,198 B2
(45) Date of Patent: *Apr. 15, 2025

(54) COLLISION AVOIDANCE ADAPTATION FOR AUTONOMOUS TRANSMISSION SYSTEMS

(71) Applicant: Telefonaktiebolaget LM Ericsson (publ), Stockholm (SE)

(72) Inventors: Reem Karaki, Aachen (DE); Jung-Fu Cheng, Fremont, CA (US); Havish Koorapaty, Saratoga, CA (US); Amitav Mukherjee, Fremont, CA (US); Evanny Obregon, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,186

(22) Filed: Nov. 6, 2023

(65) Prior Publication Data

US 2024/0073788 A1 Feb. 29, 2024

Related U.S. Application Data

(60) Continuation of application No. 17/834,525, filed on Jun. 7, 2022, now Pat. No. 11,812,368, which is a
(Continued)

(51) Int. Cl.
*H04W 48/12* (2009.01)
*H04W 8/00* (2009.01)
(Continued)

(52) U.S. Cl.
CPC ........... *H04W 48/12* (2013.01); *H04W 8/005* (2013.01); *H04W 72/0446* (2013.01); *H04W 72/569* (2023.01); *H04W 74/0816* (2013.01)

(58) Field of Classification Search
CPC ... H04W 48/12; H04W 72/569; H04W 8/005; H04W 72/0446; H04W 74/0816
See application file for complete search history.

(56) References Cited

U.S. PATENT DOCUMENTS 9,497,797 B2 11/2016 Deparis et al.
2012/0281680 A1 11/2012 Lisa et al.
(Continued)

FOREIGN PATENT DOCUMENTS

CN 103797865 A 5/2014
CN 105934973 A 9/2016
(Continued)

OTHER PUBLICATIONS

3GPP TS 136 212 v12.6.0; Technical Specification; LTE; Evolved Universal Terrestrial Radio Access (E-UTRA); Multiplexing and channel coding (3GPP TS 36.212 version 12.6.0 Release 12)—Oct. 2015.
(Continued)

*Primary Examiner* — Duc C Ho
(74) *Attorney, Agent, or Firm* — Baker Botts L.L.P.

(57) ABSTRACT

A method in a wireless device (110) comprises obtaining (1004) information related to a signal transmission configuration for autonomous uplink transmission by the wireless device, the information comprising: a set of pre-allocated resources for use by the wireless device in performing autonomous uplink transmission on at least one secondary cell established between the wireless device and a network node (115); and a periodicity associated with the set of pre-allocated resources. The method comprises performing (1008) autonomous uplink transmission according to the obtained information related to the signal transmission configuration.

20 Claims, 16 Drawing Sheets

Related U.S. Application Data continuation of application No. 16/880,144, filed on May 21, 2020, now Pat. No. 11,363,521, which is a division of application No. 15/579,460, filed as application No. PCT/SE2017/051040 on Oct. 23, 2017, now Pat. No. 10,708,851.

(60) Provisional application No. 62/412,388, filed on Oct. 25, 2016.

(51) Int. Cl.
*H04W 72/0446* (2023.01)
*H04W 72/566* (2023.01)
*H04W 74/0816* (2024.01)

(56) References Cited

U.S. PATENT DOCUMENTS

| | | | |
|---|---|---|---|
| 2013/0114505 | A1 | 5/2013 | Haim et al. |
| 2015/0215903 | A1 | 7/2015 | Zhao et al. |
| 2015/0264551 | A1 | 9/2015 | Ko et al. |
| 2015/0327201 | A1 | 11/2015 | He et al. |
| 2016/0338095 | A1 | 11/2016 | Faurie et al. |
| 2017/0134148 | A1 | 5/2017 | Yerramalli et al. |
| 2017/0230838 | A1 | 8/2017 | Yerramalli et al. |
| 2017/0367058 | A1 | 12/2017 | Pelletier et al. |
| 2018/0110063 | A1 | 4/2018 | Fan et al. |
| 2018/0123859 | A1 | 5/2018 | Liu et al. |
| 2018/0146480 | A1* | 5/2018 | Chendamarai Kannan ................. H04W 72/1268 |
| 2018/0324882 | A1 | 11/2018 | Gulati et al. |

FOREIGN PATENT DOCUMENTS

| | | | | |
|---|---|---|---|---|
| CN | 105940624 | A | 9/2016 | |
| JP | 2006230008 | A * | 8/2006 | |
| JP | 2015-505436 | A | 2/2015 | |
| WO | WO-2015158056 | A1 * | 10/2015 | ........... H04L 5/0044 |
| WO | 2016 034194 | | 3/2016 | |
| WO | 2016/047279 | | 3/2016 | |
| WO | 2016034194 | A1 | 3/2016 | |
| WO | 2016 133441 | | 8/2016 | |
| WO | 2016 182486 | | 11/2016 | |
| WO | 2017 148956 | | 9/2017 | |
| WO | 2017 184071 | A2 | 10/2017 | |

OTHER PUBLICATIONS

3GPP TS 36.211 v12.3.0; Technical Specification; 3rd Generation Partnership Project; Technical Specification Group Radio Access Network; Evolved Universal Terrestrial Radio Access (E-UTRA); Physical channels and modulation (Release 12)—Sep. 2014.

3GPP TS 36.213 v12.3.0; Technical Specification; 3rd Generation Partnership Project; Technical Specification Group Radio Access Network; Evolved Universal Terrestrial Radio Access (E-UTRA); Physical layer procedures (Release 12)—Sep. 2014.

3GPP TS 36.321 v12.1.0; Technical Specification; 3rd Generation Partnership Project; Technical Specification Group. Radio Access Network; Evolved Universal Terrestrial Radio Access (E-UTRA); Medium Access Control (MAC) protocol specification (Release 12)—Mar. 2014.

3GPP TSG RAN WG1 #82, R1-153844; Title: Uplink Channel Access for LAA; Source: Cisco Systems, Agenda Item: 7.2.4.1, Document for: Discussion and Decision, Beijing, China—Aug. 24-28, 2015.

3GPP Tsg Ran WG1 #83; R1-157041; Nov. 14-22, 2015; Anaheim, USA; Agenda item: 6.2.3.2 Source: Qualcomm Incorporated; Title: Discovery and RRM procedure for LAA; Document for: Discussion and Decision.

3GPP TSG RAN WG1 Meeting #86; R1-167074; Gothenburg, Sweden, Aug. 22-26, 2016; Agenda item: 7.2.1.1; Source: Nokia, Alcatel-Lucent Shanghai Bell; Title: On Two-Stage UL scheduling for eLAA; Document for: Discussion and Decision.

ETSI TS 136 331 Technical Specification, LTE; Evolved Universal Terrestrial Radio Access (E-UTRA); Radio Resource Control (RRC); Protocol specification (3GPP TS 36.331 version 13.0.0 Release 13, v. 13.0.0)—Jan. 2016.

Notification to Grant Patent Right for Invention issued by National Intellectual Property Administration, P.R. China for Patent Application No. 201780080555.3—May 24, 2023.

Official Communication issued for Chinese Application No. 201780080555.3—Nov. 16, 2022.

PCT Notification of Transmittal of the International Search Report and the Written Opinion of the International Searching Authority, or the Declaratinon issued for International application No. PCT/SE2017/051040—Jan. 26, 2018.

PCT Written Opinion of the International Searching Authority issued for International application No. PCT/SE2017/051040—Jan. 26, 2018.

* cited by examiner

COLLISION AVOIDANCE ADAPTATION FOR AUTONOMOUS TRANSMISSION SYSTEMS

PRIORITY

This non-provisional application is a continuation of Ser. No. 17/834,525 filed Jun. 7, 2022, now U.S. Pat. No. 11,812,368; which is a continuation application of U.S. patent application Ser. No. 16/880,144, filed May 21, 2020, now U.S. Pat. No. 11,363,521; which is a divisional application of Ser. No. 15/579,460 filed Dec. 4, 2017, now U.S. Pat. No. 10,708,851; which is a U.S. National Stage Filing under 35 U.S.C. § 371 of International Patent Application Serial No. PCT/SE2017/051040 filed Oct. 23, 2017, and entitled "Collision Avoidance Adaptation for Autonomous Transmission Systems" which claims priority to U.S. Provisional Patent Application No. 62/412,388 filed Oct. 25, 2016, each of which are hereby incorporated by reference in their entirety.

TECHNICAL FIELD

The present disclosure relates, in general, to wireless communications and, more particularly, to collision avoidance adaptation for autonomous transmission systems.

BACKGROUND

The 3$^{rd}$ Generation Partnership Project (3GPP) work on Licensed-Assisted Access (LAA) intends to allow Long Term Evolution (LTE) equipment to also operate in the unlicensed radio spectrum. Candidate bands for LTE operation in the unlicensed spectrum include 5 GHz and 3.5 GHz, among others. The unlicensed spectrum can be used as a complement to the licensed spectrum, but also allows completely standalone operation.

For the case of unlicensed spectrum used as a complement to the licensed spectrum, devices connect in the licensed spectrum (e.g., via a primary cell (PCell)) and use carrier aggregation (CA) to benefit from additional transmission capacity in the unlicensed spectrum (e.g., via a secondary cell (SCell)). The CA framework allows a device to aggregate two or more carriers, with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations, and/or imposed maximum channel occupancy time. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy. Due to the centralized coordination and dependency of terminal devices on the base-station (e.g., evolved NodeB (eNB)) for channel access in LTE operation, and imposed LBT regulations, LTE uplink (UL) performance is especially hampered. UL transmission is becoming more and more important with user-centric applications and the need for pushing data to cloud.

Today, the unlicensed 5 GHz spectrum is mainly used by equipment implementing the Institute of Electrical and Electronics Engineers (IEEE) 802.11 Wireless Local Area Network (WLAN) standard. This standard is known under its marketing brand "Wi-Fi" and allows completely standalone operation in the unlicensed spectrum. Unlike in LTE, Wi-Fi terminals can asynchronously access the medium and thus show better UL performance characteristics, especially in congested network conditions.

LTE uses Orthogonal Frequency Division Multiplexing (OFDM) in the downlink (DL) and Discrete Fourier Transform (DFT)-spread OFDM (also referred to as Single-Carrier Frequency Division Multiple Access (SC-FDMA)) in the UL.

FIG. 1 illustrates an example LTE DL physical resource. As shown in FIG. 1, the basic LTE DL physical resource can be seen as a time-frequency grid where each resource element (e.g., resource element 10) corresponds to one OFDM subcarrier during one OFDM symbol interval. The UL subframe has the same subcarrier spacing as the DL, and the same number of SC-FDMA symbols in the time domain as OFDM symbols in the DL.

FIG. 2 illustrates an example of the LTE time-domain structure. In the time domain, LTE DL transmissions are organized into radio frames (such as radio frame 20) of 10 ms. Each radio frame 20 consists of ten equally-sized subframes of length $T_{subframe}=1$ ms, as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

The resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (i.e., 1.0 ms) is known as a resource block pair. Resource blocks are numbered in the frequency domain, starting with 0 from one end of the system bandwidth.

DL transmissions are dynamically scheduled (i.e., in each subframe the base station transmits control information about which terminals data is transmitted to and upon which resource blocks the data is transmitted, in the current DL subframe). This control signaling is typically transmitted in the first 1, 2, 3 or 4 OFDM symbols in each subframe and the number n=1, 2, 3 or 4 is known as the Control Format Indicator (CFI). The DL subframe also contains common reference symbols, which are known to the receiver and used for coherent demodulation of, for example, the control information.

FIG. 3 illustrates an example DL subframe. More particularly, FIG. 3 illustrates a DL system with CFI=3 OFDM symbols as control. In the example of FIG. 3, the reference symbols shown are the cell specific reference symbols (CRS), which are used to support multiple functions, including fine-time and frequency synchronization and channel estimation for certain transmission modes.

UL transmissions are dynamically scheduled (i.e., in each DL subframe the base station transmits control information about which terminals should transmit data to the base station in subsequent subframes, and upon which resource blocks the data should be transmitted). The UL resource grid is comprised of data and UL control information in the Physical Uplink Shared Channel (PUSCH), UL control information in the Physical Uplink Control Channel (PUCCH), and various reference signals such as demodulation reference signals (DMRS) and sounding reference signals (SRS). DMRS are used for coherent demodulation of PUSCH and PUCCH data, whereas SRS is not associated with any data or control information but is generally used to estimate the UL channel quality for purpose s of frequency-selective scheduling.

FIG. 4 illustrates an example UL subframe. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Release 11 onwards, DL or UL resource assignments can also be scheduled on the Enhanced Physical Downlink Control Channel (EPDCCH). For Release 8 to Release 10, only the Physical Downlink Control Channel (PDCCH) is available. Resource grants are user equipment (UE)-specific, and are indicated by scrambling the Downlink Control Information (DCI) Cyclic Redundancy Check (CRC) with the UE-specific Cell Radio Network Temporary Identifier (C-RNTI) identifier. A unique C-RNTI is assigned by a cell to every UE associated with it, and can take values in the range 0001-FFF3 in hexadecimal format. A UE uses the same C-RNTI on all serving cells.

In LTE, the UL access is typically controlled by the eNB (i.e., scheduled). In this case, the UE would report to the eNB when data is available to be transmitted, for example by sending a Scheduling Request (SR) message. Based on this, the eNB would grant the resources and relevant information to the UE in order to carry out the transmission of a certain size of data. The assigned resources are not necessarily sufficient for the UE to transmit all the available data. In such a case, the UE may send a buffer status report (BSR) control message in the granted resources to inform the eNB about the correct size and updated size of the data waiting for transmission. Based on that, the eNB would further grant the resources to carry on with the UE UL transmission of the corrected size of data.

More particularly, every time new data arrives at the UE's empty buffer, the following procedure should be performed. Using the PUCCH, the UE informs the network that it needs to transmit data by sending a SR indicating that it needs UL access. The UE has a periodic timeslot for SR transmissions (typically on a 5, 10, or 20 ms interval). Once the eNB receives the SR request bit, it responds with a small "UL grant" that is just large enough to communicate the size of the pending buffer. The reaction to this request typically takes 3 ms. After the UE receives and processes its first UL grant (which takes about 3 ms), the UE typically sends a BSR, which is a Medium Access Control (MAC) Control Element (CE) used to provide information about the amount of pending data in the UL buffer of the UE. If the grant is big enough, the UE sends data from its buffer within this transmission as well. Whether the BSR is sent also depends on conditions specified in 3GPP TS 36.321 v12.1.0 (2014-03), "3rd Generation Partnership Project; Technical Specification Group Radio Access Network; Evolved Universal Terrestrial Radio Access (E-UTRA); Medium Access Control (MAC) protocol specification," Release 12. The eNB receives the BSR message, allocates the necessary UL resources, and sends back another UL grant that will allow the device to drain its buffer.

In total, about 16 ms (plus time to wait for a PUCCH transmission opportunity) of delay can be expected between data arrival at the empty buffer in the UE and the reception of this data in the eNB.

In case the UE is not Radio Resource Control (RRC) connected in LTE, or has lost its UL synchronization since it did not transmit or receive anything for a certain time, the UE would use the random access (RA) procedure to connect to the network, obtain synchronization, and also send the SR. If this is the case, the procedure until the data can be sent would take even longer than the SR transmission on PUCCH.

In the LTE system, the transmission formats and parameters are controlled by the eNB. Typically, the DCI contains: resources allocated for UL transmission (including whether frequency hopping is applied); modulation and coding scheme; redundancy versions; new data indicator; transmit power control command; information about DMRS; the target carrier index (in cases of cross-carrier scheduling); and other applicable control information on UL transmissions. The DCI is first protected by 16-bit CRC. The CRC bits are further scrambled by the assigned UE identity (e.g., C-RNTI). The DCI and scrambled CRC bits are further protected by convolutional coding. The encoded bits are transmitted from the eNB to UE using either PDCCH or EPDCCH.

Semi-Persistent Scheduling (SPS) is similar to pre-scheduling in that the UE modem is granted radio resources periodically. The main difference is that there is no explicit grant signal sent every time the UE modem is granted resources. Instead, the eNB sends a long-lasting grant that allows the UE modem to keep track of when it is granted resources and use that time/frequency slot for sending data.

Instant Uplink Access (IUA) was discussed in the 3GPP latency reduction study item. IUA is a form of pre-scheduling to allow transmission of data without explicit SRs. IUA is an enhancement of the SPS framework that introduces a new UE condition: "Do not transmit using the grant unless there is data in buffer."

In the current LTE framework, a UE with an UL grant is forced to send something. Even if the UE has no UL data, the UE would send padding. In addition, the lowest SPS period is 10 subframes. With fast UL, two modifications are done to SPS to enable IUA. First, it allows an SPS period down to 1 subframe (or transmission time interval (TTI)). Second, it allows a skip-padding configuration (i.e., the UE does not need to transmit in the granted UL resources if it does not have data for that subframe).

In the current LTE specifications, the SPS and IUA features are defined only for the primary cell (PCell). The configuration and commands of SPS and IUA are also defined and performed on a per-UE basis.

In typical deployments of WLANs, carrier sense multiple access with collision avoidance (CSMA/CA) is used for medium access. This means that the channel is sensed to perform a Clear Channel Assessment (CCA), and a transmission is initiated only if the channel is declared Idle. If the channel is declared Busy, the transmission is essentially deferred until the channel is deemed to be Idle.

FIG. 5 illustrates an example of the LBT mechanism in Wi-Fi. After a Wi-Fi station A transmits a data frame to a station B, station B transmits the acknowledgement (ACK) frame back to station A with a delay of 16 μs. The ACK frame is transmitted by station B without performing a listen-before-talk (LBT) operation. To prevent another station interfering with such an ACK frame transmission, a station shall defer for a duration of 34 μs (referred to as Distributed Inter-frame Space (DIFS)) after the channel is observed to be occupied before assessing again whether the channel is occupied. Thus, a station that wishes to transmit first performs a CCA by sensing the medium for a fixed duration DIFS. If the medium is idle, then the station assumes that it may take ownership of the medium and begin a frame exchange sequence. If the medium is busy, the station waits for the medium to go idle, defers for DIFS, and waits for a further random backoff period.

In the basic protocol described above, when the medium becomes available multiple Wi-Fi stations may be ready to transmit. This can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, is set in the IEEE specifications. Note that collisions can still occur even under this random backoff protocol, for example when there are many stations contending for channel access. Hence, to avoid recurring collisions, the backoff contention window size CW is doubled whenever the station detects a collision of its transmission up to a limit, CWmax, also set in the IEEE specifications. When a station succeeds in a transmission without collision, it resets its random backoff contention window size back to the default value CWmin.

FIG. 6 illustrates an example of LBT in European Telecommunications Standards Institute (ETSI) EN 301.893. For a device not utilizing the Wi-Fi protocol, the ETSI standard EN 301.893, v1.7.1 provides the following requirements and minimum behavior for the load-based CCA.

A first requirement is that before a transmission or a burst of transmissions on an Operating Channel, the equipment shall perform a Clear Channel Assessment (CCA) check using "energy detect." The equipment shall observe the Operating Channel(s) for the duration of the CCA observation time which shall be not less than 20 µs. The CCA observation time used by the equipment shall be declared by the manufacturer. The Operating Channel shall be considered occupied if the energy level in the channel exceeds the threshold corresponding to the power level given in the fifth requirement described below. If the equipment finds the channel to be clear, it may transmit immediately (see the third requirement described below). This is shown in the example of FIG. 6 at time intervals 1 and 2. At time interval 1, the equipment performs a CCA check as described above. Having found the channel to be clear, the equipment transmits immediately during time interval 2.

A second requirement is that if the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied". When the counter reaches zero, the equipment may transmit.

This is shown in the example of FIG. 6 at time interval 3. At the beginning of time interval 3, the equipment performs a CCA check and finds that the channel is occupied. Thus, the equipment performs an Extended CCA check as described above. In the example of FIG. 6, the value of N is initialized by N=3. The counter N is decremented every time a CCA slot is considered to be unoccupied. In the example of FIG. 6, the first channel CCA slot in the Extended CCA check is determined to be unoccupied, so the counter is decremented from 3 to 2. The second channel CCA slot in the Extended CCA check is determined to be occupied, so the counter is not decremented from 2. The third channel CCA slot in the Extended CCA check is determined to be unoccupied, so the counter is decremented from 2 to 1. Similarly, the fourth channel CCA slot in the Extended CCA check is determined to be unoccupied, so the counter is decremented from 1 to 0. When the counter reaches zero, the equipment transmits during time interval 4.

A third requirement is that the total time that an equipment makes use of an Operating Channel is the Maximum Channel Occupancy Time which shall be less than $(13/32) \times q$ ms, with q as defined in the second requirement described above, after which the device shall perform the Extended CCA described in the second requirement above.

A fourth requirement is that the equipment, upon correct reception of a packet which was intended for this equipment, can skip CCA and immediately proceed with the transmission of management and control frames (e.g., ACK and Block ACK frames). This is shown in the example of FIG. 6 during time interval 5. A consecutive sequence of transmissions by the equipment, without it performing a new CCA, shall not exceed the Maximum Channel Occupancy Time as defined in the third requirement described above. For the purpose of multi-cast, the ACK transmissions (associated with the same data packet) of the individual devices are allowed to take place in a sequence.

A fifth requirement is that the energy detection threshold for the CCA shall be proportional to the maximum transmit power (PH) of the transmitter. For a 23 dBm e.i.r.p. transmitter, the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

Up to now, the spectrum used by LTE is dedicated to LTE. This has the advantage that the LTE system does not need to care about the coexistence issue. It also allows spectrum efficiency to be maximized. The spectrum allocated to LTE is limited, however, and cannot meet the ever-increasing demand for larger throughput from applications and/or services. Therefore, Release 13 LAA extended LTE to exploit unlicensed spectrum in addition to licensed spectrum. Unlicensed spectrum can, by definition, be simultaneously used by multiple different technologies. LTE therefore needs to consider the coexistence issue with other systems such as IEEE 802.11 (Wi-Fi). Operating LTE in the same manner in unlicensed spectrum as in licensed spectrum can seriously degrade the performance of Wi-Fi, as Wi-Fi will not transmit once it detects the channel is occupied.

FIG. 7 illustrates an example of LAA to unlicensed spectrum using LTE carrier aggregation. One way to utilize the unlicensed spectrum reliably is to transmit essential control signals and channels on a licensed carrier. That is, as shown in FIG. 7, a wireless device 110 (e.g., a UE) is connected to a PCell 705 in the licensed band and one or more secondary cells (SCells) 710 in the unlicensed band. As used herein, a secondary cell in unlicensed spectrum is referred to as a LAA secondary cell (LAA SCell). In the case of standalone operation (as in MulteFire), no licensed cell is available for UL control signal transmissions.

The combination of the LBT and maximum transmission burst duration functionalities of LAA/MulteFire implies that LTE reference signals are not guaranteed to be transmitted with a fixed periodicity. To support synchronization, frequency estimation, and radio resource management (RRM)

measurements, the discovery reference signal/subframe (DRS) is periodically transmitted and contains the Primary Synchronization Signal (PSS), Secondary Synchronization Signal (SSS), Cell-Specific Reference Signal (CRS), and Channel State Information Reference Signal (CSI-RS) for LAA, and also the Physical Broadcast Channel (PBCH) and Session Information Block (SIB) transmission for Multe-Fire. Due to LBT constraints, DRS transmission cannot be guaranteed in a particular time instance. Hence, the DRS can be transmitted within a window specified by the DRS Measurement Time Configuration (DMTC).

SUMMARY

To address problems with existing approaches, disclosed is a method in a wireless device. The method comprises obtaining information related to a signal transmission configuration for autonomous uplink transmission by the wireless device, the information comprising: a set of pre-allocated resources for use by the wireless device in performing autonomous uplink transmission on at least one secondary cell established between the wireless device and a network node; and a periodicity associated with the set of pre-allocated resources. The method comprises performing autonomous uplink transmission according to the obtained information related to the signal transmission configuration.

In certain embodiments, the information related to the signal transmission configuration for autonomous uplink transmission by the wireless device may further comprise information about one or more subframes that should be avoided by the wireless device when performing autonomous uplink transmission. In certain embodiments, the information about one or more subframes that should be avoided by the wireless device when performing autonomous uplink transmission may comprise one or more of: an indication of a subframe that the network node uses to transmit a discovery reference signal and that the wireless device should avoid; and an indication of a subframe immediately preceding the subframe that the network node uses to transmit the discovery reference signal and that the wireless device should avoid.

In certain embodiments, the information about one or more subframes that should be avoided by the wireless device when performing autonomous uplink transmission may comprise one or more of: an indication of all subframes within a discovery reference signal measurement timing configuration window and that the wireless device should avoid; an indication of a subframe immediately preceding the discovery reference signal measurement timing configuration window and that the wireless device should avoid; and an indication of the subframes within the discovery reference signal measurement timing configuration window and of the subframe immediately preceding the discovery reference signal measurement timing configuration window and that the wireless device should avoid until the wireless device receives a discovery reference signal.

In certain embodiments, the information about one or more subframes that should be avoided by the wireless device when performing autonomous uplink transmission may comprise an indication of one or more subframes configured as measurement gaps, and that the wireless device should avoid. In certain embodiments, the information about one or more subframes that should be avoided by the wireless device when performing autonomous uplink transmission may comprise an indication of one or more subframes between reception of a first trigger and a second trigger when a two-stage grant is used by the network node to allocate resources to the wireless device, and that the wireless device should avoid.

In certain embodiments, obtaining information related to the signal transmission configuration for autonomous uplink transmission by the wireless device may comprise receiving an indication of a subframe pattern applicable to autonomous uplink transmission by the wireless device. The indication of the subframe pattern may be a bitmap.

In certain embodiments, the information related to the signal transmission configuration for autonomous uplink transmission by the wireless device may comprise one or more of: an offset value for determining a length of a sensing duration to be used by the wireless device before a next allowed transmission period; and a rotation periodicity. The method may comprise receiving at least one of the offset value and the rotation periodicity via one or more of: a common physical downlink control channel; and higher layer signaling. The offset value may correspond to a priority level of the wireless device for performing autonomous uplink transmissions.

In certain embodiments, the method may comprise receiving an indication that the wireless device should deactivate autonomous uplink transmission. In certain embodiments, the method may comprise receiving an indication that the wireless device should activate autonomous uplink transmission. One or more of the indication that the wireless device should deactivate autonomous uplink transmission and the indication that the wireless device should activate autonomous uplink transmission may be received over one or more of: broadcast-type control signaling; and dedicated control signaling.

In certain embodiments, the at least one secondary cell established between the wireless device and the network node may be in unlicensed spectrum.

Also disclosed is a wireless device. The wireless device comprises processing circuitry. The processing circuitry is configured to obtain information related to a signal transmission configuration for autonomous uplink transmission by the wireless device, the information comprising: a set of pre-allocated resources for use by the wireless device in performing autonomous uplink transmission on at least one secondary cell established between the wireless device and a network node; and a periodicity associated with the set of pre-allocated resources. The processing circuitry is configured to perform autonomous uplink transmission according to the obtained information related to the signal transmission configuration.

Also disclosed is a wireless device. The wireless device comprises a receiving module, a determining module, and a communication module. The determining module is configured to obtain information related to a signal transmission configuration for autonomous uplink transmission by the wireless device, the information comprising: a set of pre-allocated resources for use by the wireless device in performing autonomous uplink transmission on at least one secondary cell established between the wireless device and a network node; and a periodicity associated with the set of pre-allocated resources. The communication module is configured to perform autonomous uplink transmission according to the obtained information related to the signal transmission configuration.

Also disclosed is a method in a network node. The method comprises determining information related to a signal transmission configuration for autonomous uplink transmission by a wireless device, the information comprising: a set of pre-allocated resources for use by the wireless device in performing autonomous uplink transmission on at least one secondary cell established between the network node and the wireless device; and a periodicity associated with the set of pre-allocated resources. The method comprises configuring the wireless device to perform autonomous uplink transmission according to the determined information related to the signal transmission configuration.

In certain embodiments, the information related to the signal transmission configuration for autonomous uplink transmission by the wireless device may further comprise information about one or more subframes that should be avoided by the wireless device when performing autonomous uplink transmission. In certain embodiments, the one or more subframes that should be avoided by the wireless device when performing autonomous uplink transmission may comprise one or more of: a subframe that the network node uses to transmit a discovery reference signal; and a subframe immediately preceding the subframe that the network node uses to transmit the discovery reference signal.

In certain embodiments, the one or more subframes that should be avoided by the wireless device when performing autonomous uplink transmission may comprise one or more of: all subframes within a discovery reference signal measurement timing configuration window; a subframe immediately preceding the discovery reference signal measurement timing configuration window; and the subframes within the discovery reference signal measurement timing configuration window and the subframe immediately preceding the discovery reference signal measurement timing configuration window until the wireless device receives a discovery reference signal.

In certain embodiments, the one or more subframes that should be avoided by the wireless device when performing autonomous uplink transmission may comprise one or more subframes configured as measurement gaps.

In certain embodiments, the one or more subframes that should be avoided by the wireless device when performing autonomous uplink transmission may comprise one or more subframes between reception of a first trigger and a second trigger when a two-stage grant is used by the network node to allocate resources to the wireless device.

In certain embodiments, configuring the wireless device to perform autonomous uplink transmission according to the determined information related to the signal transmission configuration may comprise sending the determined information related to the signal transmission configuration to the wireless device.

In certain embodiments, configuring the wireless device to perform autonomous uplink transmission according to the determined information related to the signal transmission configuration may comprise sending an indication of a subframe pattern applicable to autonomous uplink transmission by the wireless device. In certain embodiments, the indication of the subframe pattern may be a bitmap.

In certain embodiments, the information related to the signal transmission configuration for autonomous uplink transmission by the wireless device may comprise one or more of: an offset value for determining a length of a sensing duration to be used by the wireless device before a next allowed transmission period; and a rotation periodicity. The method may comprise sending at least one of the offset value and the rotation periodicity to the wireless device via one or more of: a common physical downlink control channel; and higher layer signaling. The offset value may correspond to a priority level of the wireless device for performing autonomous uplink transmissions.

In certain embodiments, the method may comprise: determining, based on one or more criteria, that the wireless device should deactivate autonomous uplink transmission and switch to schedule-based access; and sending, to the wireless device, an indication that the wireless device should deactivate autonomous uplink transmission. The one or more criteria may comprise one or more of: a buffer status at the network node; a traffic type; a buffer build-up; a cleanliness of the channel; a number of UEs with non-empty UL buffer; a Negative Acknowledgement (NACK) to ACK ratio for one or more wireless devices; and a number of collisions on a channel where multiple wireless devices attempt to access the channel at the same time. In certain embodiments, the method may comprise: determining that the wireless device should switch from scheduled-based access to autonomous uplink transmission; and sending, to the wireless device, an indication that the wireless device should activate autonomous uplink transmission. In certain embodiments, one or more of the indication that the wireless device should deactivate autonomous uplink transmission and the indication that the wireless device should activate autonomous uplink transmission are sent using one or more of: broadcast-type control signaling; and dedicated control signaling.

In certain embodiments, the at least one secondary cell established between the network node and the wireless device may be in unlicensed spectrum.

Also disclosed is a network node. The network node comprises processing circuitry. The processing circuitry is configured to determine information related to a signal transmission configuration for autonomous uplink transmission by a wireless device, the information comprising: a set of pre-allocated resources for use by the wireless device in performing autonomous uplink transmission on at least one secondary cell established between the network node and the wireless device; and a periodicity associated with the set of pre-allocated resources. The processing circuitry is configured to configure the wireless device to perform autonomous uplink transmission according to the determined information related to the signal transmission configuration.

Also disclosed is a network node. The network node comprises a communication module, a receiving module, and a determining module. The determining module is configured to determine information related to a signal transmission configuration for autonomous uplink transmission by a wireless device, the information comprising: a set of pre-allocated resources for use by the wireless device in performing autonomous uplink transmission on at least one secondary cell established between the network node and the wireless device; and a periodicity associated with the set of pre-allocated resources. The determining module is configured to configure the wireless device to perform autonomous uplink transmission according to the determined information related to the signal transmission configuration.

Certain embodiments of the present disclosure may provide one or more technical advantages. For example, certain embodiments may advantageously allow the LTE system to enhance its UL channel access, especially in unlicensed spectrum. As another example, certain embodiments may advantageously reduce UL latency at low-load conditions and increase the channel utilization for UL access. As still another example, certain embodiments may advantageously reduce contention on the unlicensed channel in loaded situations. As yet another example, certain embodiments may improve efficiency of LTE in the unlicensed spectrum, which in turn may benefit and support spectral coexistence with other collocated networks. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
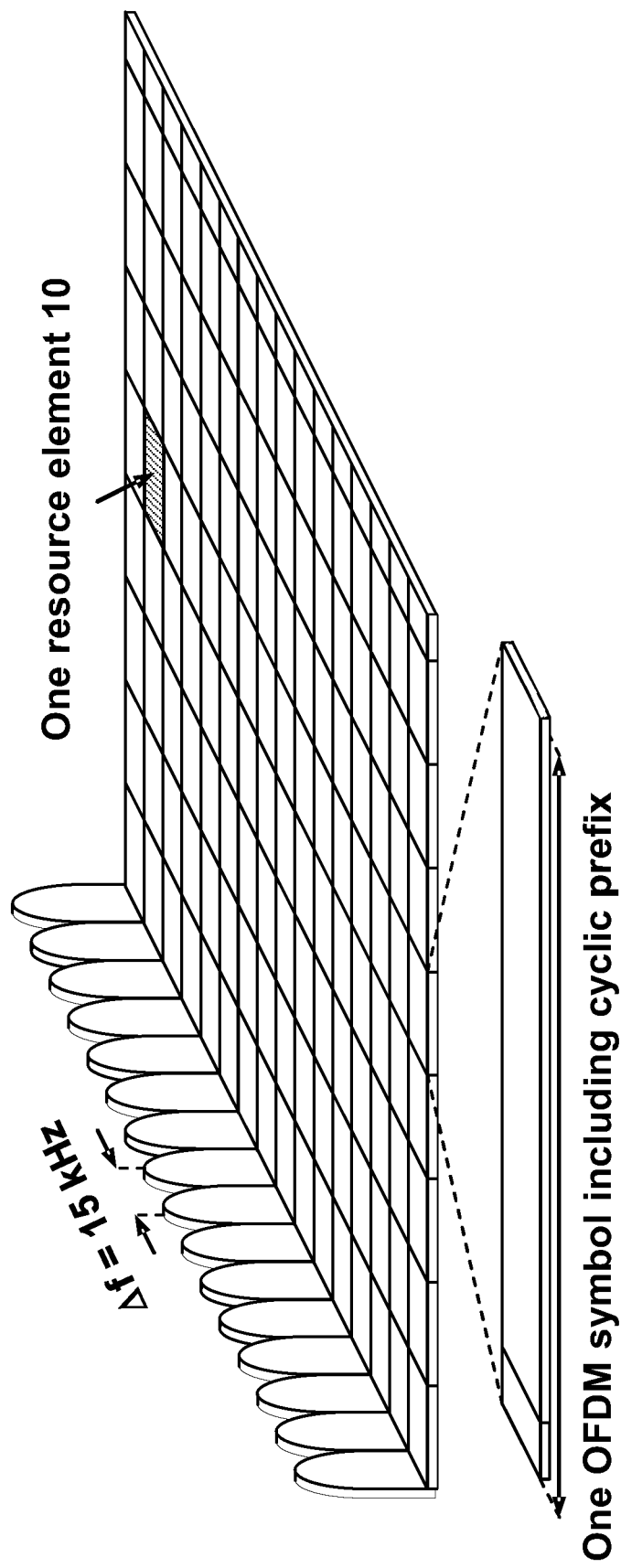
FIG. 1 illustrates an example LTE DL physical resource.
Figure 2:
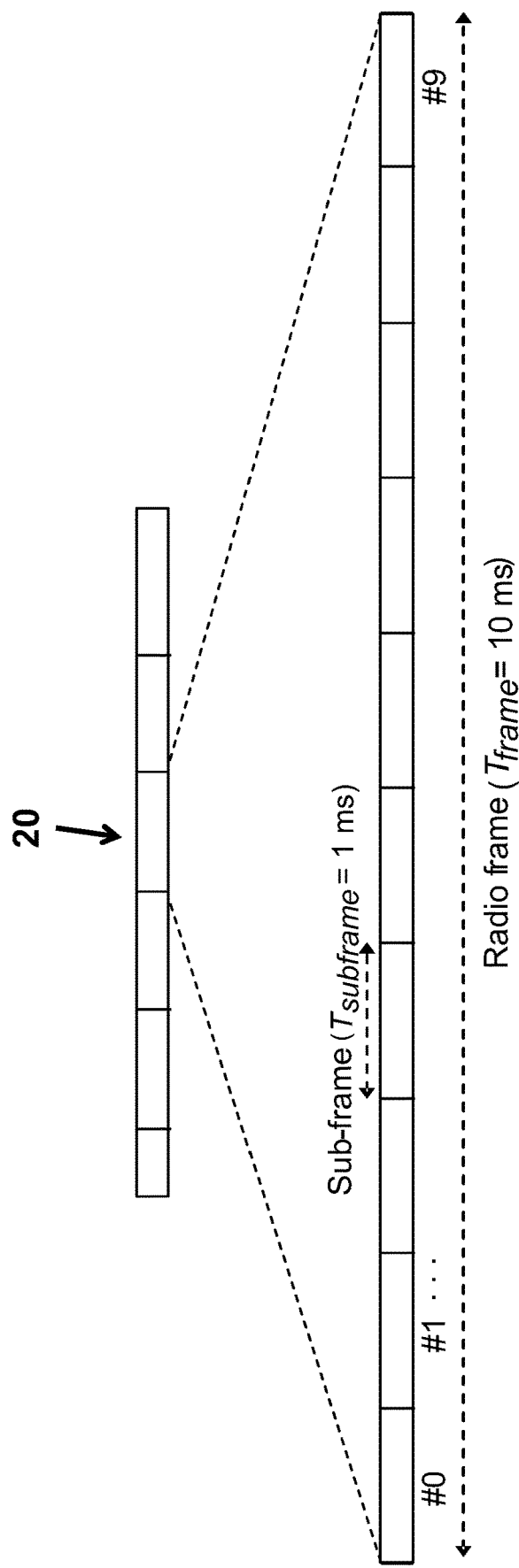
FIG. 2 illustrates an example of the LTE time-domain structure.
Figure 3:
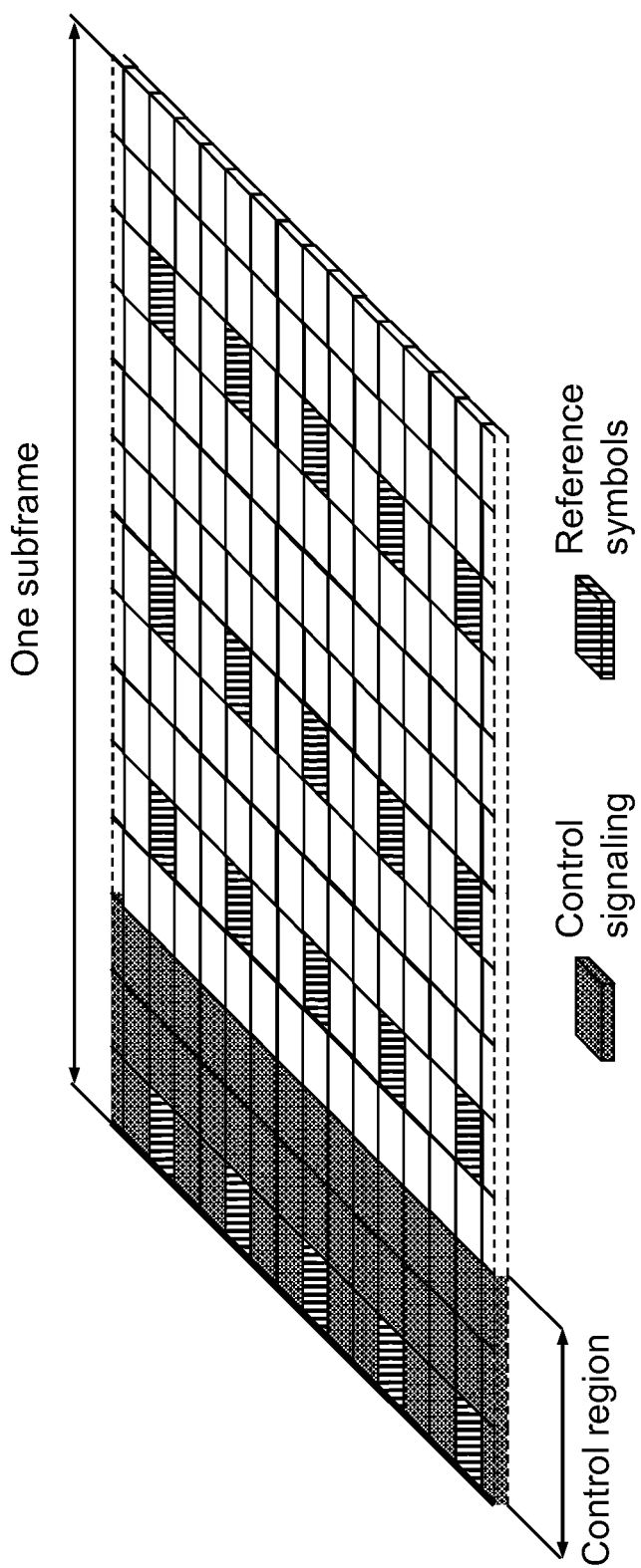
FIG. 3 illustrates an example DL subframe.
Figure 4:
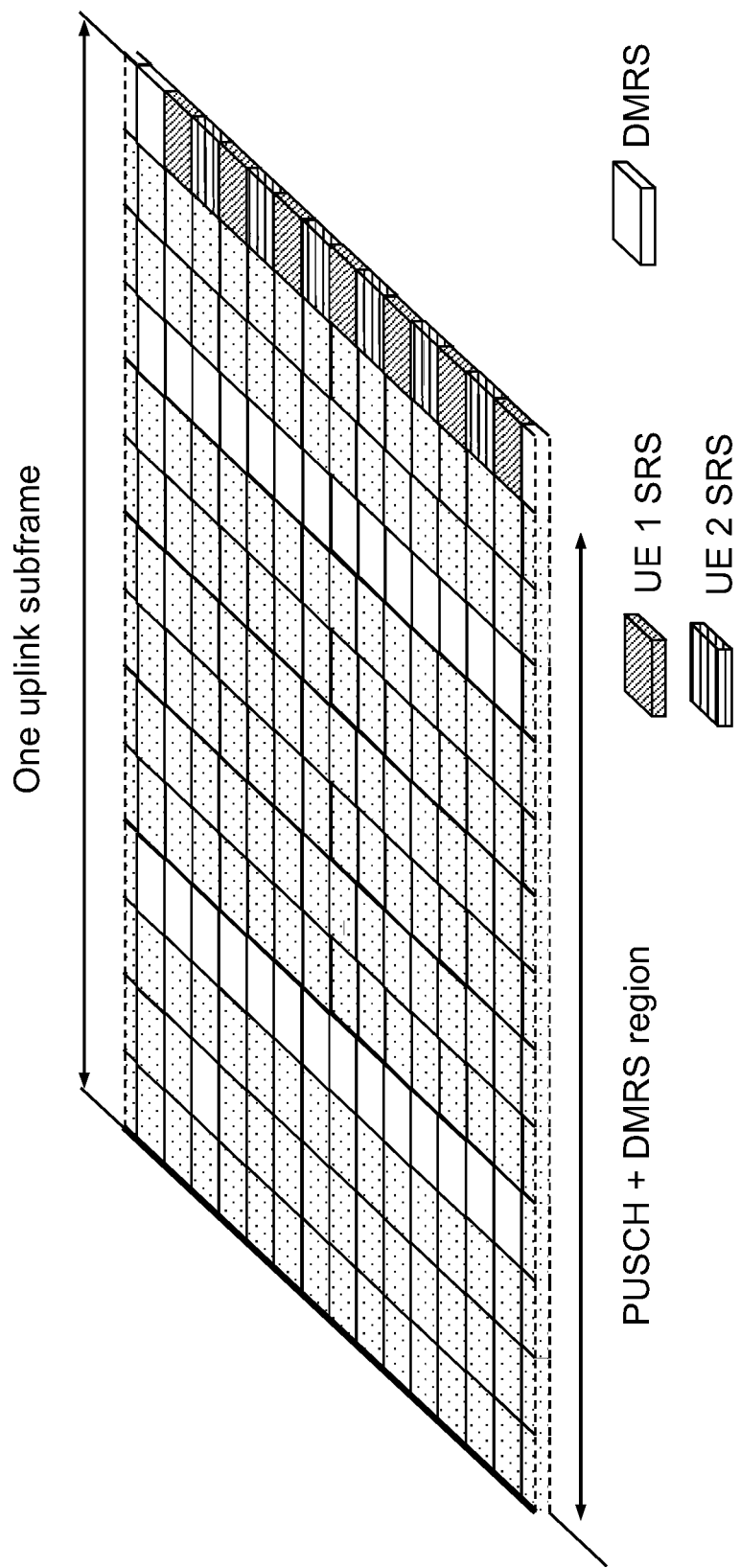
FIG. 4 illustrates an example UL subframe.
Figure 5:
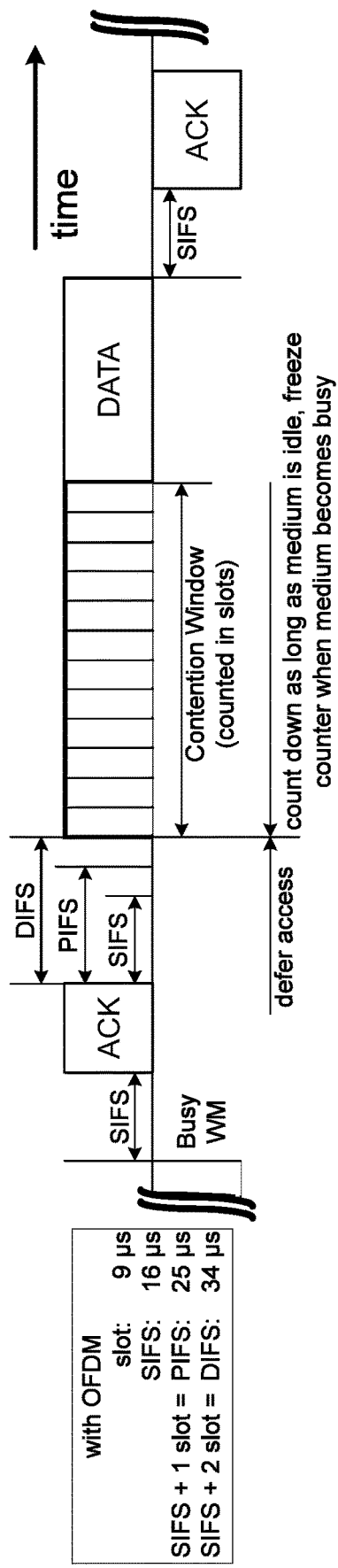
FIG. 5 illustrates an example of the LBT mechanism in Wi-Fi.
Figure 6:
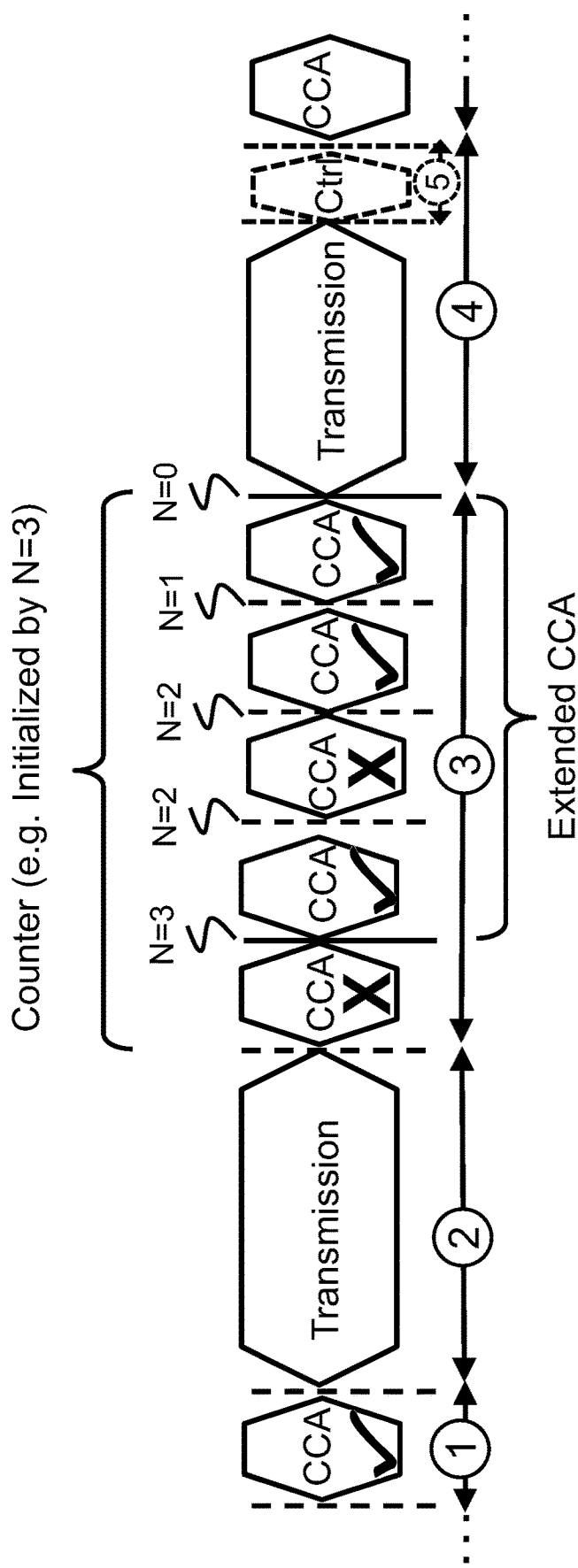
FIG. 6 illustrates an example of LBT in ETSI EN 301.893.
Figure 7:
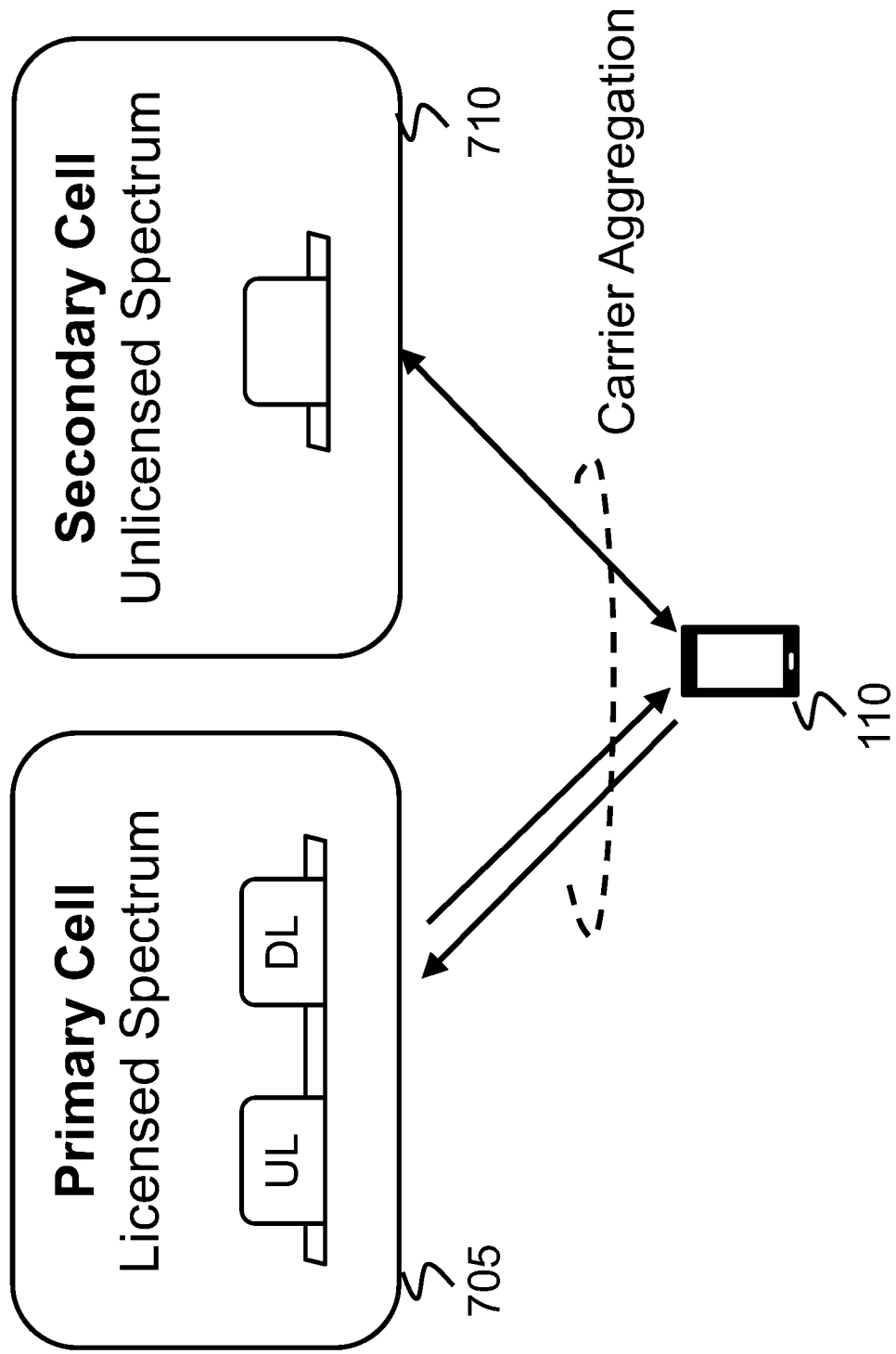
FIG. 7 illustrates an example of LAA to unlicensed spectrum using LTE carrier aggregation.

For LTE UL channel access, both the wireless device (e.g., a UE) and the network node (e.g., an eNB) need to perform LBT operations corresponding to the SR, scheduling grant and data transmission phases. In contrast, Wi-Fi terminals only need to perform LBT once in the UL data transmission phase. Furthermore, Wi-Fi terminals can asynchronously send data compared to the synchronized LTE system. Thus, Wi-Fi terminals have a natural advantage over LTE terminals in UL data transmission, and show superior performance in collocated deployment scenarios according to simulation studies.

Overall study results show that Wi-Fi has a better UL performance than LTE, particularly in low-load or less congested network conditions. As the network congestion or load is increased, the LTE channel access mechanism (Time Division Multiple Access (TDMA)-type) becomes more efficient, but Wi-Fi UL performance is still superior. Two different UL concepts for LTE/LAA/MulteFire have been proposed to increase the flexibility and the performance of UL. According to a first concept, similar to Wi-Fi behavior, a wireless device can start the UL transmission without waiting for permission from the network node. In other words, a wireless device can perform LBT to gain UL channel access whenever the UL data arrives, without transmitting a SR or having an UL grant from the network node. The wireless device can use the unscheduled mode for the whole data transmission or, alternatively, transmit using unscheduled mode for the first N transmission bursts and then switch back to the network node-controlled scheduling mode. According to a second concept, SPS grants with granted periodicity down to 1 ms are proposed to achieve similar behavior as autonomous UL. With a periodicity of 1 ms, a wireless device can attempt to transmit every subframe for the whole granted period.

Nonetheless, at high load autonomous UL transmission can lead to a high number of collisions and longer deferring. In such a scenario, it is beneficial that the network node gradually adapt its behavior from unscheduled autonomous-based UL access towards schedule-based access.

The present disclosure contemplates various embodiments that may address these and other deficiencies associated with existing approaches. For example, in certain embodiments methods for avoiding collisions during autonomous transmissions are disclosed. In certain embodiments, a wireless device is configured to avoid specific subframes when performing autonomous UL transmission. In certain embodiments, aligning the starting point of the transmissions from different wireless devices is avoided, for example by giving rotating priority to start transmission in different subframes among wireless devices configured with autonomous UL transmission. In certain embodiments, the UL access is adapted from unscheduled autonomous transmission to schedule-based access (and vice versa) in LAA and/or standalone LTE. In some cases, the dynamic switching between scheduled and unscheduled UL access may be based on the load situation. Employing one or more of these procedures may advantageously improve the UL performance in LAA or stand-alone LTE by avoiding collisions among wireless devices.

According to one example embodiment, a method in a wireless device is disclosed. The wireless device obtains information related to a signal transmission configuration for autonomous UL transmission by the wireless device. The information may comprise: a set of pre-allocated resources for use by the wireless device in performing autonomous UL transmission on at least one secondary cell established between the wireless device and a network node; and a periodicity associated with the set of pre-allocated resources. The wireless device may obtain the information related to the signal transmission configuration for autonomous UL transmission in any suitable manner. For example, the wireless device may receive the information related to the signal transmission configuration from a network node (e.g., an eNB). As another example, the wireless device may determine the information related to the signal transmission configuration autonomously.

The wireless device performs autonomous UL transmission according to the obtained information related to the signal transmission configuration. In certain embodiments, the information related to the signal transmission configuration for autonomous UL transmission by the wireless device may further comprise information about one or more subframes that should be avoided by the wireless device when performing autonomous UL transmission. In such a scenario, the wireless device may avoid one or more subframes when performing autonomous UL transmission based on the information about the one or more subframes that should be avoided.

According to another example embodiment, a method in a network node (e.g., an eNB) is disclosed. The network node determines information related to a signal transmission configuration for autonomous UL transmission by a wireless device. The information may comprise: a set of pre-allocated resources for use by the wireless device in performing autonomous UL transmission on at least one secondary cell established between the network node and the wireless device; and a periodicity associated with the set of pre-allocated resources. In certain embodiments, the information related to the signal transmission configuration for autonomous UL transmission by the wireless device may further comprise information about one or more subframes that should be avoided by the wireless device when performing autonomous UL transmission. The network node configures the wireless device to perform autonomous UL transmission according to the determined information related to the signal transmission configuration.

Certain embodiments of the present disclosure may provide one or more technical advantages. For example, certain embodiments may advantageously allow the LTE system to enhance its UL channel access, especially in unlicensed spectrum. As another example, certain embodiments may advantageously reduce UL latency at low-load conditions and increase the channel utilization for UL access. As still another example, certain embodiments may reduce contention on the unlicensed channel in loaded situations. As yet another example, certain embodiments may improve efficiency of LTE in the unlicensed spectrum, which in turn may benefit and support spectral coexistence with other collocated networks, such as Wi-Fi and other LTE in unlicensed spectrum (LTE-U, LAA and/or standalone LTE) networks. Other advantages may be readily apparent to one having skill in the art. Certain embodiments may have none, some, or all of the recited advantages.

Figure 8:
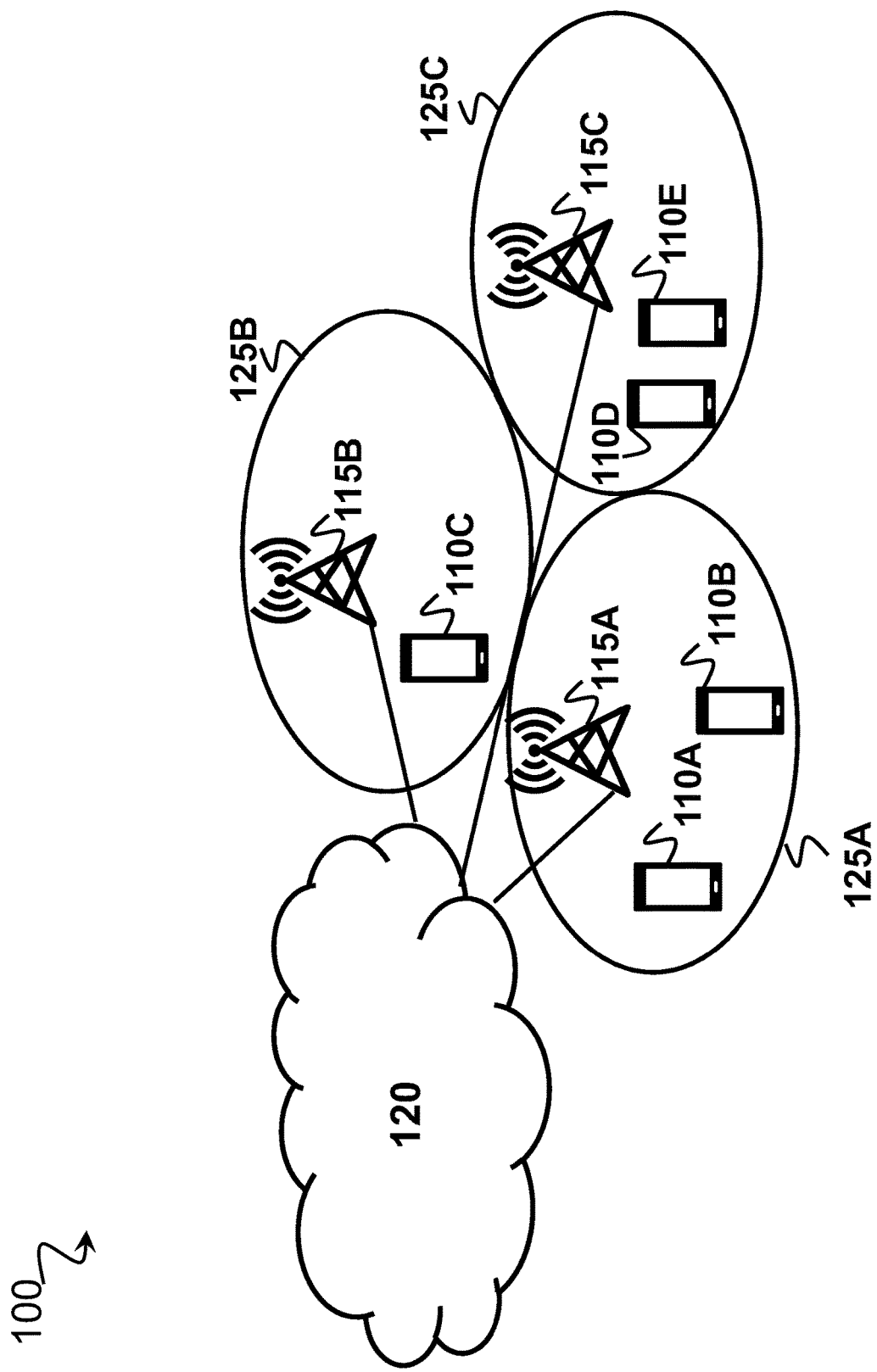
FIG. 8 illustrates an exemplary wireless communications network, in accordance with certain embodiments.

FIG. 8 is a block diagram illustrating an embodiment of a network 100, in accordance with certain embodiments. Network 100 includes one or more wireless devices 110 (e.g., a UE) and one or more network node(s) 115 (e.g., an eNB). Wireless devices 110 may communicate with network nodes 115 over a wireless interface. For example, a wireless device 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. Wireless devices 110 may be capable of performing LAA and CA operations, and may be capable of operating in both the licensed and unlicensed spectrum. In some embodiments, wireless devices 110 may have device-to-device (D2D) capability. Thus, wireless devices 110 may be able to receive signals from and/or transmit signals directly to another wireless device.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices 110 may be configured to transmit and/or receive information without direct human interaction. For instance, a wireless device 110 may be designed to transmit information to a network on a predetermined schedule, when triggered by an internal or external event, or in response to requests from the network. Generally, a wireless device 110 may represent any device capable of, configured for, arranged for, and/or operable for wireless communication, for example radio communication devices. Examples of wireless devices 110 include, but are not limited to, UEs such as smart phones. Further examples include wireless cameras, wireless-enabled tablet computers, mobile terminals, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, or any other suitable devices. Wireless devices 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless devices 110 may support D2D communication, for example by implementing a 3GPP standard for sidelink communication, and may in this case be referred to as a D2D communication device.

As yet another specific example, in an Internet of Things (IOT) scenario, a wireless device 110 may represent a machine or other device that performs monitoring and/or measurements, and transmits the results of such monitoring and/or measurements to another wireless device and/or a network node. The wireless device may in this case be a M2M device, which may in a 3GPP context be referred to as a MTC device. As one particular example, a wireless device 110 may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device 110 may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device 110 as described above may be mobile, in which case it may also be referred to as a mobile device or a mobile terminal.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio APs. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

The terminology such as network node and wireless device should be considered non-limiting and does in particular not imply a certain hierarchical relation between the two; in general "network node" could be considered as device 1 and "wireless device" device 2, and these two devices communicate with each other over some radio channel.

Example embodiments of wireless device 110, network nodes 115, and other network nodes (such as radio network controller or core network node) are described in more detail below with respect to FIGS. 12-16.

Although FIG. 8 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in an LTE/MulteFire network, the embodiments may be implemented in any appropriate type of telecommunication system supporting any suitable communication standards (including 5G standards) and using any suitable components, and are applicable to any radio access technology (RAT) or multi-RAT systems in which a wireless device receives and/or transmits signals (e.g., data). For example, the various embodiments described herein may be applicable to LTE, LTE-Advanced, LTE in Unlicensed Spectrum (LTE-U), MulteFire, NR, 5G, IoT, NB-IoT, UMTS, HSPA, GSM, cdma2000, WCDMA, WiMax, UMB, WiFi, another suitable radio access technology, or any suitable combination of one or more radio access technologies. Although the design of autonomous transmission systems with collision avoidance adaptation and related embodiments may be described herein using the LAA/MulteFire UL as examples, the present disclosure is not limited to these examples. Rather, the present disclosure contemplates that the various embodiments described herein may be applied to other systems as well as DL or sidelinks.

As described above, the present disclosure contemplates various embodiments that may address certain deficiencies associated with existing approaches to autonomous UL transmission. In some cases, the SPS/IUA features of the LTE specifications are modified to support effective autonomous UL transmission protocol for LAA and MulteFire systems. For example, in certain embodiments the SPS/IUA features may be extended to the secondary cells. In some cases, wireless devices 110 may be configured with 1 ms SPS periodicity and allowed to transmit with full bandwidth. As another example, the SPS periodicity configuration may be updated on (e)PDCCH/CPDCCH.

In certain embodiments, a wireless device 110 (e.g., wireless device 110A) obtains information related to a signal transmission configuration for autonomous UL transmission by wireless device 110A. The information related to the signal transmission configuration may include a set of pre-allocated resources for use by wireless device 110A in performing autonomous UL transmission on at least one secondary cell established between wireless device 110A and a network node 115, such as network node 115A, as well as a periodicity associated with the set of pre-allocated resources. Wireless device 110A performs autonomous UL transmission according to the obtained information related to the signal transmission configuration.

In certain embodiments, the information related to the signal transmission configuration for autonomous UL transmission by wireless device 110A includes information about one or more subframes that should be avoided by wireless device 110A when performing autonomous UL transmission. In some cases, the information related to the signal transmission configuration for autonomous UL transmission may identify one or more types of subframes, as well as indicate that wireless device 110A should avoid these subframes when performing autonomous UL transmission. This may advantageously enable wireless device 110A to automatically avoid specific subframes when it performs autonomous UL transmission, unlike the existing approach in SPS/IUA.

Wireless device 110A may be configured to avoid any suitable type of subframe. As one example, wireless device 110A may avoid a subframe that network node 115A uses to transmit the DRS. In certain embodiments, the subframe before the DRS subframe may also be avoided by wireless device 110A. As another example, wireless device 110A may avoid all subframes within the DMTC window, as well as the subframe before the window. As still another example, wireless device 110A may avoid the subframes within the DMTC window, as well as the one before the window, until the DRS subframe is received. As yet another example, wireless device 110A may avoid one or more subframes configured as measurement gaps. As another example, wireless device 110A may avoid all subframes between the reception of a first trigger and the second trigger when a 2-stage grant is used by network node 115A to allocate resources to wireless device 110A.

Wireless device 110A may obtain the information related to the signal transmission configuration in any suitable manner. As one example, in certain embodiments network node 115A may determine the information related to the signal transmission configuration for autonomous UL transmission by wireless device 110A and configure wireless device 110A to perform autonomous UL transmission according to the determined information related to the signal transmission configuration. In some cases, network node 115A may configure wireless device 110A to perform autonomous UL transmission according to the determined information related to the signal transmission configuration by sending the determined information related to the signal transmission configuration to wireless device 110A. In some cases, network node 115A may configure wireless device 110A to perform autonomous UL transmission according to the determined information by sending, to wireless device 110A, an indication of a subframe pattern applicable to autonomous UL transmission by wireless device 110A. The indication of the subframe pattern may be in any suitable form. In certain embodiments, for example, the indication of the subframe pattern may be a bitmap.

As another example, wireless device 110A may obtain the information related to the signal transmission configuration autonomously. For example, the information related to the signal transmission configuration may be preconfigured in wireless device 110A (for example at the time of manufacture). In such a scenario, upon determining the subframes that are used, for example, for DRS, the DMTC window, measurement gaps, and/or subframes used for the first and second triggers of a 2-stage grant, wireless device 110A may automatically avoid autonomous UL transmission in one or more of those sub-frames.

In certain embodiments, to enable autonomous UL transmission, wireless device 110A may be configured with SPS/IUA for certain subframes within a set of subframes or within a frame. In some cases, the configured subframe pattern may repeat for every new set of subframes or frame. In certain embodiments, the configured pattern may be indicated by a bitmap, for example in a bitmap received from network node 115A as described above.

As noted above, autonomous UL transmission can lead to a high number of collisions because the UL transmissions of wireless devices 110 are not specially coordinated at high load. In certain embodiments, the problem may be addressed by giving wireless devices 110 (such as wireless devices 110A and 110B) that are configured with autonomous UL transmissions rotating priority to start transmission in different subframes.

In the LTE system, certain allowed transmission starting points are defined (e.g., once or twice per subframe). The backoff (BO) counter for the LBT procedure may or may not be reduced continuously outside the allowed transmission period (referred to as the freeze period). Nevertheless, if the LBT procedure finishes during the freeze period, the transmission cannot start immediately, instead it is postponed until the next allowed transmission period.

In case of scheduled behavior, an approach may be used that reduces the backoff counter continuously (even within the freeze period). In such a scenario, if the counter reaches 0 within an "allowed transmission period," then transmission by wireless device 110 may be commenced at that point in time. If the counter reaches 1 within the freeze period, then transmission by a wireless device 110 is postponed to the next allowed transmission period. In such a scenario, a wireless device 110 is subject to a final CCA before transmission starts, where the Final CCA=minimum sensing time+1 CCA slot. In certain embodiments, the minimum sensing time is 25 μs, and each CCA slot is 9 μs for LAA and MulteFire operations in 5 GHz or 2.4 GHz bands.

For autonomous UL, the number of wireless devices 110 attempting to transmit at the same time is not controlled by a network node 115. For instance, if two wireless devices 110 (e.g., wireless devices 110A and 110B) with different initial backoff value finish their backoff at different points during the freeze period, they will both be deferred until the next possible allowed transmission period. Both will perform a final CCA check. If both CCA checks succeed, they will start simultaneous transmission and collide.

To overcome this problem and reduce the chances that different wireless devices 110 start their transmission at the same time, in certain embodiments a network node 115 (such as network node 115A) can spread out the earliest possible transmission time for wireless devices 110 (e.g., wireless devices 110A and 110B) with non-empty UL buffer. This can be achieved by assigning different sensing durations to wireless devices 110A and 110B before the next possible allowed transmission period (i.e., final CCA=minimum sensing time+BO slot duration*offset). By assigning different sensing durations (i.e., offset values) to wireless devices 110A and 110B, this will advantageously give wireless devices 110A and 110B different priority to access the channel at the next transmission period. If, for example, wireless device 110A has the smaller offset value, if not deferred by any other ongoing interference, wireless device 110A will finish its final CCA the earliest and grab the channel before other wireless devices 110 (such as wireless device 110B) that have higher offset values. Wireless device 110A grabs the channel by transmitting signals before the next allowed transmission boundary where the data transmission starts.

Wireless devices 110A and 110B may obtain their respective offset values in any suitable manner. In certain embodiments, the information related to the signal transmission configuration for autonomous UL transmission obtained by wireless devices 110A and 110B may include an offset value. As noted above, in certain embodiments one or more of wireless devices 110A and 110B may obtain the information related to the signal transmission configuration for autonomous UL transmission, including an offset value, autonomously. In such a scenario, one or more of wireless devices 110A and 110B may autonomously select an offset value (e.g., randomly or according to one or more predefined rules).

As noted above, in certain embodiments one or more of wireless devices 110A and 110B may obtain the information related to the signal transmission configuration for autonomous UL transmission, including an offset value, from network node 115A (for example, when network node 115A determines the information related to the signal transmission configuration and configures one or more of wireless devices 110A and 110B to perform autonomous UL transmission according to the determined information related to the signal transmission configuration). In such a scenario, network node 115A may send the determined information related to the signal transmission configuration, including an offset value, to one or more of wireless devices 110A and 110B.

In certain embodiments, a combination approach may be used. For example, one or more of wireless devices 110A and 110B may obtain information related to the signal transmission configuration for autonomous UL transmission from network node 115A. The information related to the signal transmission configuration obtained from network node 115A may include an indication that one or more of wireless device 110A and 110B can use an offset value in performing autonomous UL transmission. Having received an indication that an offset value can be used in performing autonomous UL transmission, one or more of wireless device 110A and 110B may autonomously select the offset value to be used as described above (e.g., randomly or according to one or more predefined rules). Note that wireless devices 110A and 110B may obtain the information related to the signal transmission configuration for autonomous UL transmission, which may include the offset value, in the same way or in different ways.

In certain embodiments, the priority may be statically defined. For example, network node 115A may use the SPS grant to set the offsets. In this example approach, wireless devices 110A and 110B will have fixed priorities unless network node 115A sends a new SPS grant to update the offset value. Network node 115A may update the offset value, for example, using (e)PDCCH. In some cases, the priority may be dynamically defined. In such a scenario, access priorities among wireless devices 110A and 110B are rotated. Each of wireless devices 110A and 110B obtain an offset and a rotation_periodicity. Wireless devices 110A and 110B may calculate their respective effective offsets in subframe n as:

$$eoffset = (offset + n) \mod periodicity \qquad (1)$$

Wireless devices 110A and 110B then perform a final CCA of minimum sensing time+eoffset CCA slots. In some cases, the rotation_periodicity can be set to be equal to the number of wireless devices 110 with non-empty UL buffer. In some cases, the rotation_periodicity can be set to a number larger than the number of wireless devices 110 with non-empty UL buffer. That is, rotation_periodicity does not need to be signaled frequently. For instance, even if the periodicity is set to 4, and the number of remaining active UL wireless devices 110 is reduced to 2, the priority rotation will still work.

Wireless devices 110A and 110B may obtain the periodicity in any suitable manner. As one example, wireless devices 110A and 110B may obtain the periodicity autonomously. As another example, in certain embodiments network node 115A may signal the periodicity to wireless devices 110A and 110B via a Common Physical Downlink Control Channel (CPDCCH). As still another example, the periodicity may be configured via higher layer signaling (e.g., LTE RRC signaling). As another example, in certain embodiments the periodicity may be fixed to a certain value. In such a scenario, the value of the periodicity may be fixed to any suitable value, such as, for example, 5.

Other approaches are possible to prevent wireless devices 110 from starting their autonomous UL transmissions at the same time. For example, ensuring different wireless devices 110 start their autonomous UL transmission at different times can also be achieved if wireless devices 110 do not count down their random backoff counters during the freeze period, and instead sense the channel and count their counters down only during the periods where they are allowed to transmit. When a wireless device 110 counts down to zero, it can transmit. This randomizes the start times for different wireless devices 110 before the next possible boundary where data transmission starts.

In certain embodiments, a wireless device 110 may be allowed to decrement its backoff counter for a fixed number of slots during the freeze period, for example based on its contention window size. In such a scenario, the wireless device 110 counts down the rest of the slots only during the period when it is allowed to transmit. For instance, if wireless device 110A has a contention window size of 15, wireless device 110A could be allowed to count down only 5 slots within the freeze period and the remaining slots must be counted down during the period when it is allowed to transmit.

In some cases, it may be beneficial for a network node 115 (e.g., network node 115A) to adapt UL access from unscheduled autonomous transmission to schedule-based access (and vice versa), for example based on the load situation in a cell (e.g., cell 125A). As noted above, at high load autonomous UL transmission can lead to a high number of collisions and longer deferring. In such a scenario, it would be beneficial for network node 115A to gradually adapt its behavior from unscheduled autonomous-based UL access towards schedule-based access. In some cases, such as in low-load situations, it may likewise be beneficial to adapt the behavior of wireless devices 110 from schedule-based access toward unscheduled autonomous-based UL access. In certain embodiments, network node 115A may gradually adapt the system behavior from unscheduled autonomous UL transmission toward schedule-based access (and vice versa) in LAA and/or standalone LTE. Employing one or more of the procedures described below may advantageously improve the UL performance in LAA or stand-alone LTE by avoiding collisions among wireless devices 110.

Autonomous UL is based on overbooking the same resources in frequency and time domain for all wireless devices 110. This means wireless devices 110 in the same cell 125 will compete with each other to access the channel. This can introduce a higher collision rate due to multiple wireless devices 110 starting their transmission during the same sub frame. This can be due, for example, to wireless devices 110 having the same deferring time and/or due to wireless devices 110 not hearing each other's transmission (e.g., due to hidden nodes).

If a network node 115 does not identify transmissions of a wireless device 110 (for example due to very low Signal to Interference plus Noise Ratio (SINR)), the network node 115 cannot determine that the wireless device 110 is failing to transmit unless reported by the wireless device 110.

In certain embodiments, a network node 115 (e.g., network node 115A) can suspend the fully autonomous UL behavior at any time for certain wireless devices 110 or for all wireless devices 110. This can be achieved in a variety of ways. Network node 115A may send, to one or more wireless devices 110, an indication that the wireless devices 110 should deactivate autonomous UL transmission. As one example, network node 115A can send an SPS deactivation command (for example, on PDCCH) to one or more wireless devices 110. As another example, network node 115A can overwrite an old SPS grant with a new SPS grant. The new SPS grant may have a lower periodicity and/or part of the bandwidth. The deactivation command and/or new SPS grant may be signaled in any suitable manner. As one example, the signaling may be done via broadcast-type control signaling to all wireless devices 110 or a group of wireless devices 110. As another example, the signaling may be done via multiple dedicated control signaling to all wireless devices 110 or a subset of wireless devices 110.

Network node 115A may determine that one or more wireless devices 110 should deactivate autonomous UL transmission and switch to schedule-based access based on any suitable criteria. As one example, the decision to suspend autonomous UL behavior for one or more wireless devices 110 may be based on one or more of: the buffer status at network node 115A, the traffic type and the buffer build-up. For instance, if network node 115A has DL data to serve, or the DL buffer is growing, network node 115A may deactivate the autonomous UL behavior for one or more wireless devices 110 to avoid competing with its own users to access the channel. Additionally, when DL traffic type has high priority then network node 115A can deactivate autonomous UL behavior for all wireless devices 110 to ensure fulfillment of the requirements (e.g., data rate or delay).

As another example, the decision to suspend autonomous UL behavior for one or more wireless devices 110 may be based on the cleanliness of the channel, which may be monitored by network node 115A. For example, network node 115A can monitor the SINR of the UL received packets and compare it a certain threshold. The comparison may be done in any suitable manner. In certain embodiments, the comparison can be done considering the instantaneous SINR or by taking the average of N SINR samples over a certain period of time. In some cases, the comparison can be done at a single-wireless device level or at a cell level. As further examples, the decision can be based on one or more of an unsuccessful transmission ratio, average interference power level in the cell, and sensed energy.

As another example, the decision to suspend autonomous UL behavior for one or more wireless devices 110 may be based on a number of wireless devices 110 with non-empty UL buffer. As another example, the decision to suspend autonomous UL behavior for one or more wireless devices 110 may be based on a ratio of NACK to ACK for a certain one or more wireless devices 110. In some cases, different NACK to ACK ratio thresholds can be considered for scheduled and autonomous wireless devices 110.

As another example, the decision to suspend autonomous UL behavior for one or more wireless devices 110 may be based on the number of collisions on the channel where multiple wireless devices 110 attempt to access the channel at the same time. Network node 115A may monitor collisions on the channel where multiple wireless devices 110 attempt to access the channel at the same time by detecting DMRS transmissions from wireless devices 110. When the fraction of resources where multiple DMRS transmissions are detected exceeds a certain threshold, network node 115A may suspend autonomous UL access for one or more wireless devices 110 or simply reduce the number of resources available for autonomous UL access while shifting more wireless devices 110 to scheduled access. DMRS detection can be used in conjunction with any of the previously listed techniques.

It may be beneficial for network node 115A to obtain feedback from a wireless device 110 about the SPS resources assigned to it. In certain embodiments, the wireless device 110 can ask network node 115 to suspend the autonomous UL behavior by triggering a scheduling request.

For a wireless device 110 (e.g., wireless device 110A) with a non-empty UL buffer that is using autonomous UL, network node 115A can track the time duration since the last time it successfully received an UL transmission from wireless device 110A. Alternatively, wireless device 110A can monitor the fraction of UL resources for which collisions occur as measured by the detection of multiple DMRS patterns within a subframe. If any of the metrics above is larger than a certain threshold (i.e., wireless device 110A failed to access the channel due to high competition and long defer duration, or the number of collisions was very high), network node 115A can perform one or more of the following operations. As one example, network node 115A can dedicate certain resources (e.g., time and frequency) for wireless device 110A without overbooking the same resources to other wireless devices 110. This may require network node 115A to send a new SPS grant that overwrites the previous SPS grant. As another example, network node 115A may consider that as an implicit release of the SPS resources. Wireless device 110A will be aware of the deactivation of the SPS resources as it can track the time since the last successful channel access.

The threshold for time between successful autonomous UL transmission can be set in any suitable manner. As a non-limiting example, in certain embodiments the threshold for time between successful autonomous UL transmissions can be set based on the UL traffic type or the number of active autonomous wireless devices 110 in the cell.

For a wireless device 110 (or group of wireless devices 110) served using schedule-based access in the UL, network node 115A can gradually switch one or more wireless devices 110 to use unscheduled access. The decision to switch one or more wireless devices 110 to unscheduled access can be made in any suitable manner and based on any suitable criteria. As one example, the decision to switch one or more wireless devices 110 to unscheduled access may be made based on the buffer status at network node 115A and the buffer build-up. If network node 115A does not have DL data anymore, for example, it may activate the autonomous UL behavior to allow a wireless device 110 to access the channel during any subframe.

As another example, the decision to switch one or more wireless devices 110 to unscheduled access may be based on a number of wireless devices 110 with non-empty UL buffer. If, for example, wireless device 110A is the only remaining wireless device with non-empty buffer, network node 115A may activate autonomous UL for wireless device 110A since it does not have any competing wireless devices in the same serving cell.

As another example, the decision to switch one or more wireless devices 110 to unscheduled access may be based on a cleanliness of the channel. As noted above, network node 115A may monitor the cleanliness of the channel. For example, network node 115A can monitor the SINR of the UL received packets and compare it to a certain threshold. The comparison can be done in any suitable manner. As a non-limiting example, the comparison can be done considering the instantaneous SINR or by taking the average of N SINR samples over certain period of time. The comparison can be done at single-wireless device level or at a cell level. In some cases, the decision can also be based on an unsuccessful transmission ratio, an average interference power level in the cell, or sensed energy.

As another example, the decision to switch one or more wireless devices 110 to unscheduled access may be based on a NACK to ACK ratio for a certain one or more wireless devices 110. As another example, the decision to switch one or more wireless devices 110 to unscheduled access may be based on the collision rate as measured by the fraction of UL subframes where multiple DMRS signals are detected.

In certain embodiments, the decision about the SPS assigned resources can be based on one or more of: a cleanliness of the channel; a time duration since the last successful channel access; the size of the contention window of a wireless device 110; a NACK to ACK ratio; and a collision ratio based on DMRS detection.

Figure 9:
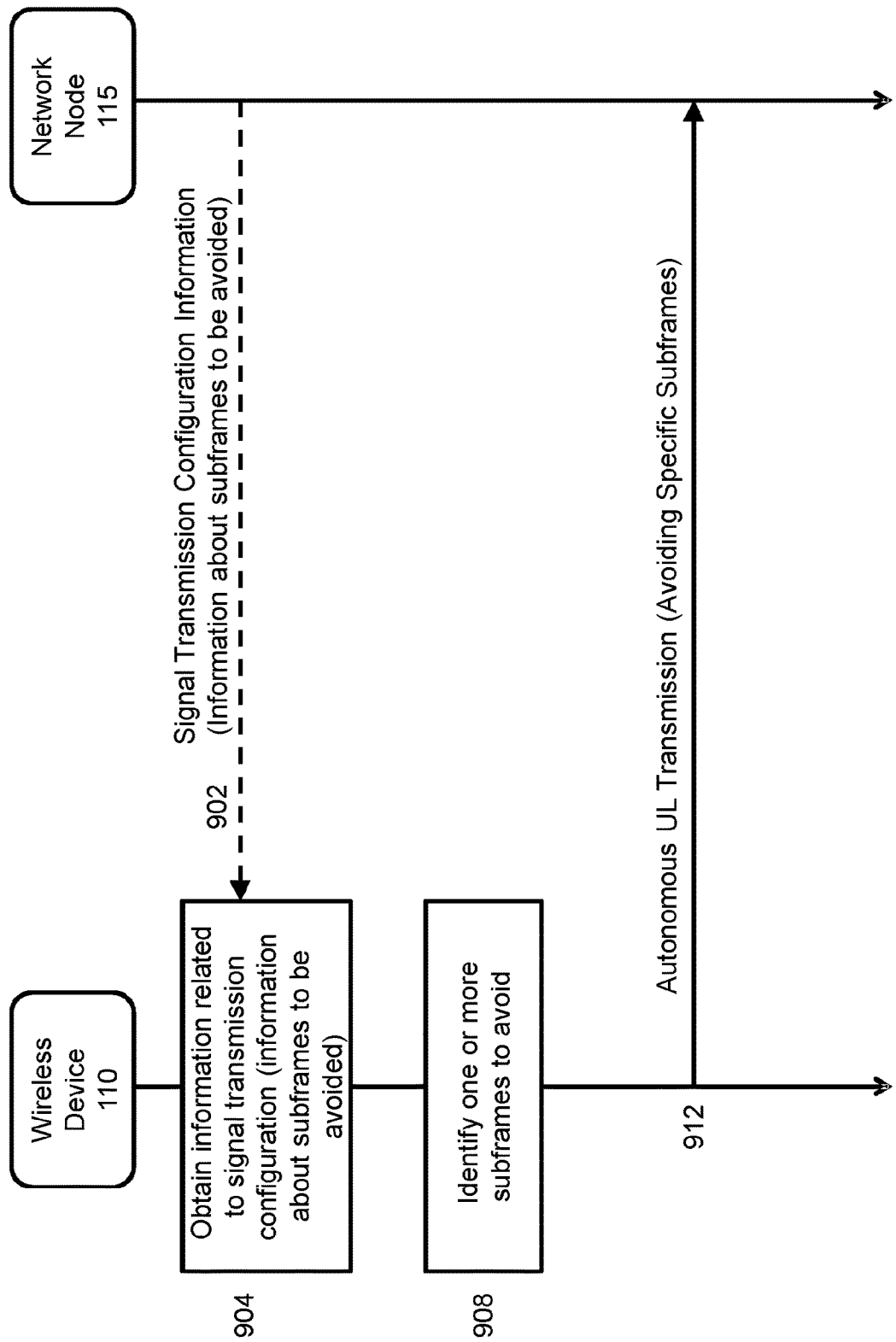
FIG. 9 is a signal flow diagram, in accordance with certain embodiments.

FIG. 9 is a signal flow diagram, in accordance with certain embodiments. More particularly, FIG. 9 is a signal flow diagram illustrating an example of avoiding specific subframes during autonomous UL transmission by a wireless device 110. At step 904, wireless device 110 obtains information related to a signal transmission configuration for autonomous UL transmission by wireless device 110. In the example embodiment of FIG. 9, the information related to the signal transmission configuration for autonomous UL transmission by wireless device 110 includes information about one or more subframes that should be avoided by wireless device 110 when performing autonomous UL transmission.

As described above, wireless device 110 may obtain the information related to the signal transmission configuration, including information about the one or more subframes that should be avoided by wireless device 110 when performing autonomous UL transmission, in a variety of ways. In certain embodiments, at step 904 wireless device 110 obtains the information related to the signal transmission configuration autonomously. For example, the information related to the signal transmission configuration may be preconfigured in wireless device 110 (for example at the time of manufacture).

Optionally, in certain embodiments at step 902 wireless device 110 may receive, from network node 115, the information related to the signal transmission configuration, including the information about the one or more subframes that should be avoided by wireless device 110 when performing autonomous UL transmission. In such a scenario, wireless device 110 may determine the information related to the signal transmission configuration, including the information about the one or more subframes that should be avoided by wireless device 110 when performing autonomous UL transmission, from the signal transmission configuration information received from network node 115.

Wireless device 110 may be configured to avoid any suitable type of subframe. As one example, wireless device 110 may avoid a subframe that network node 115 (e.g., an eNB) uses to transmit the DRS. In certain embodiments, the subframe before the DRS subframe may also be avoided. As another example, wireless device 110 may avoid all subframes within the DMTC window, as well as the subframe before the window. As still another example, wireless device 110 may avoid the subframes within the DMTC window, as well as the one before the window until the DRS subframe is received. As yet another example, wireless device 110 may avoid one or more subframes configured as measurement gaps. As another example, wireless device 110 may avoid all subframes between the reception of a first trigger and the second trigger when a 2-stage grant is used by network node 115 to allocate resources to wireless device 110. In certain embodiments, wireless device 110 may avoid any suitable combination of the above-described subframes.

At step 908, wireless device 110 identifies one or more subframes to avoid based on the obtained information related to the signal transmission configuration. At step 912, wireless device 110 performs autonomous UL transmission, avoiding one or more specific subframes as indicated by the obtained information related to the signal transmission configuration.

Figure 10:
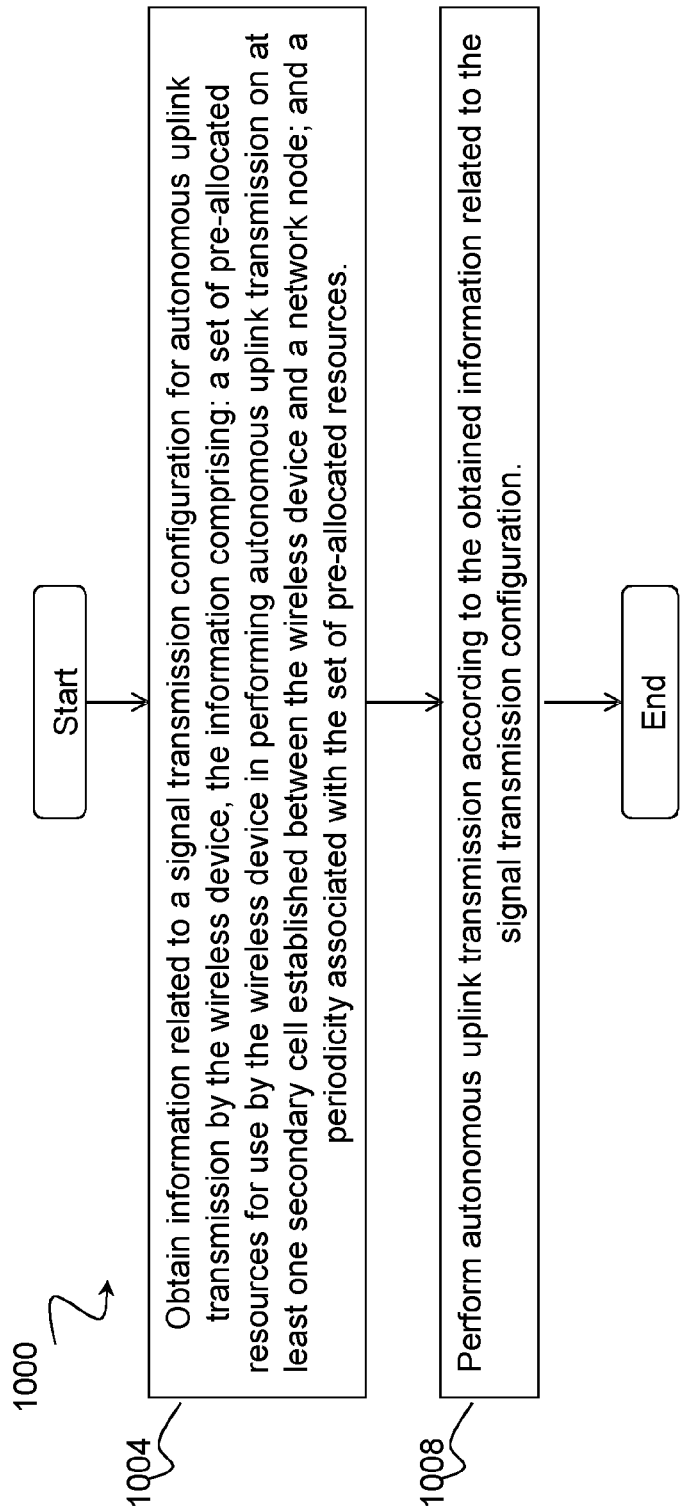
FIG. 10 is a flow diagram of a method in a wireless device, in accordance with certain embodiments.

FIG. 10 is a flow diagram of a method 1000 in a wireless device, in accordance with certain embodiments. Method 1000 begins at step 1004, where the wireless device obtains information related to a signal transmission configuration for autonomous uplink transmission by the wireless device, the information comprising: a set of pre-allocated resources for use by the wireless device in performing autonomous uplink transmission on at least one secondary cell established between the wireless device and a network node; and a periodicity associated with the set of pre-allocated resources. In certain embodiments, the at least one secondary cell established between the wireless device and the network node may be in unlicensed spectrum. In certain embodiments, obtaining information related to the signal transmission configuration for autonomous uplink transmission by the wireless device may comprise receiving an indication of a subframe pattern applicable to autonomous uplink transmission by the wireless device. The indication of the subframe pattern may be a bitmap.

In certain embodiments, the information related to the signal transmission configuration for autonomous UL transmission by the wireless device may further comprise information about one or more subframes that should be avoided by the wireless device when performing autonomous uplink transmission. The information about one or more subframes that should be avoided by the wireless device when performing autonomous uplink transmission may comprise one or more of: an indication of a subframe that the network node uses to transmit a discovery reference signal and that the wireless device should avoid; and an indication of a subframe immediately preceding the subframe that the network node uses to transmit the discovery reference signal and that the wireless device should avoid. The information about one or more subframes that should be avoided by the wireless device when performing autonomous uplink transmission may comprise one or more of: an indication of all subframes within a discovery reference signal measurement timing configuration window and that the wireless device should avoid; an indication of a subframe immediately preceding the discovery reference signal measurement timing configuration window and that the wireless device should avoid; and an indication of the subframes within the discovery reference signal measurement timing configuration window and of the subframe immediately preceding the discovery reference signal measurement timing configuration window and that the wireless device should avoid until the wireless device receives a discovery reference signal. The information about one or more subframes that should be avoided by the wireless device when performing autonomous uplink transmission may comprise an indication of one or more subframes configured as measurement gaps, and that the wireless device should avoid. The information about one or more subframes that should be avoided by the wireless device when performing autonomous uplink transmission may comprise: an indication of one or more subframes between reception of a first trigger and a second trigger when a two-stage grant is used by the network node to allocate resources to the wireless device, and that the wireless device should avoid.

In certain embodiments, the information related to the signal transmission configuration for autonomous uplink transmission by the wireless device may comprise one or more of: an offset value for determining a length of a sensing duration to be used by the wireless device before a next allowed transmission period; and a rotation periodicity. The method may comprise receiving at least one of the offset value and the rotation periodicity via one or more of: a common physical downlink control channel; and higher layer signaling. In certain embodiments, the offset value corresponds to a priority level of the wireless device for performing autonomous uplink transmissions.

In certain embodiments, the method may comprise receiving an indication that the wireless device should activate autonomous uplink transmission.

At step 1008, the wireless device performs autonomous uplink transmission according to the obtained information related to the signal transmission configuration. In certain embodiments, the method may comprise receiving an indication that the wireless device should deactivate autonomous uplink transmission. In certain embodiments, one or more of the indication that the wireless device should deactivate autonomous uplink transmission and the indication that the wireless device should activate autonomous uplink transmission may be received over one or more of: broadcast-type control signaling; and dedicated control signaling.

Figure 11:
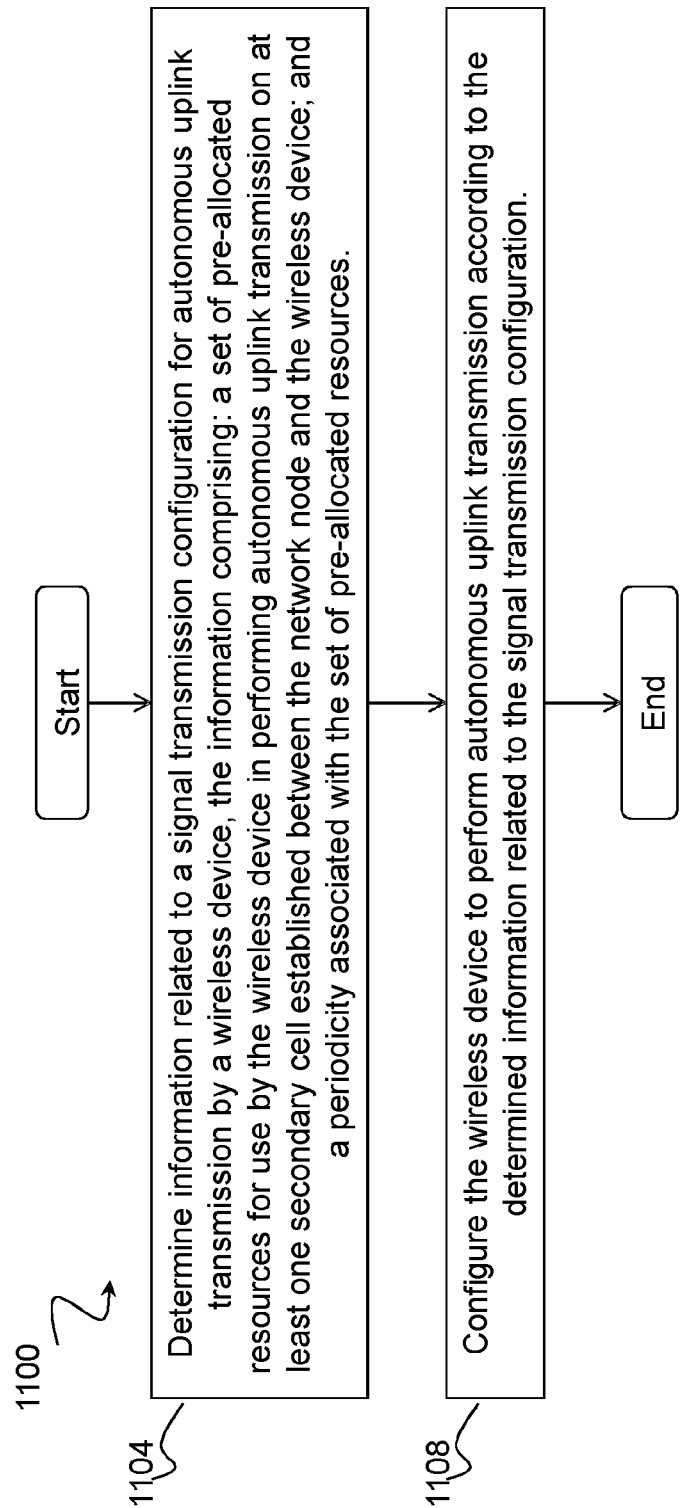
FIG. 11 is a flow diagram of a method in a network node, in accordance with certain embodiments.

FIG. 11 is a flow diagram of a method 1100 in a network node, in accordance with certain embodiments. The method begins at step 1104, where the network node determines information related to a signal transmission configuration for autonomous UL transmission by a wireless device, the information comprising: a set of pre-allocated resources for use by the wireless device in performing autonomous UL transmission on at least one secondary cell established between the network node and the wireless device; and a periodicity associated with the set of pre-allocated resources. In certain embodiments, the at least one secondary cell established between the network node and the wireless device is in unlicensed spectrum.

In certain embodiments, the information related to the signal transmission configuration for autonomous UL transmission by the wireless device may further comprise information about one or more subframes that should be avoided by the wireless device when performing autonomous UL transmission. The one or more subframes that should be avoided by the wireless device when performing autonomous UL transmission may comprise one or more of: a subframe that the network node uses to transmit a discovery reference signal; and a subframe immediately preceding the subframe that the network node uses to transmit the discovery reference signal. The one or more subframes that should be avoided by the wireless device when performing autonomous UL transmission may comprise one or more of: a subframe that the network node uses to transmit a discovery reference signal; and a subframe immediately preceding the subframe that the network node uses to transmit the discovery reference signal. The one or more subframes that should be avoided by the wireless device when performing autonomous UL transmission may comprise one or more of: all subframes within a discovery reference signal measurement timing configuration window; a subframe immediately preceding the discovery reference signal measurement timing configuration window; and the subframes within the discovery reference signal measurement timing configuration window and the subframe immediately preceding the discovery reference signal measurement timing configuration window until the wireless device receives a discovery reference signal. The one or more subframes that should be avoided by the wireless device when performing autonomous UL transmission may comprise one or more subframes configured as measurement gaps. The one or more subframes that should be avoided by the wireless device when performing autonomous UL transmission may comprise one or more subframes between reception of a first trigger and a second trigger when a two-stage grant is used by the network node to allocate resources to the wireless device.

At step 1108, the network node configures the wireless device to perform autonomous UL transmission according to the determined information related to the signal transmission configuration. In certain embodiments, configuring the wireless device to perform autonomous UL transmission according to the determined information related to the signal transmission configuration may comprise sending the determined information related to the signal transmission configuration to the wireless device.

In certain embodiments, configuring the wireless device to perform autonomous UL transmission according to the determined information related to the signal transmission configuration may comprise sending an indication of a subframe pattern applicable to autonomous UL transmission by the wireless device. The indication of the subframe pattern may be a bitmap.

In certain embodiments, the information related to the signal transmission configuration for autonomous UL transmission by the wireless device may comprise one or more of: an offset value for determining a length of a sensing duration to be used by the wireless device before a next allowed transmission period; and a rotation periodicity. The method may comprise sending at least one of the offset value and the rotation periodicity to the wireless device via one or more of: a common physical downlink control channel; and higher layer signaling. In certain embodiments, the offset value corresponds to a priority level of the wireless device for performing autonomous UL transmissions.

In certain embodiments, the method may comprise determining, based on one or more criteria, that the wireless device should deactivate autonomous UL transmission and switch to schedule-based access. The one or more criteria may comprise one or more of: a buffer status at the network node; a traffic type; a buffer build-up; a cleanliness of the channel; a number of UEs with non-empty UL buffer; a NACK to ACK ratio for one or more wireless devices; and a number of collisions on a channel where multiple wireless devices attempt to access the channel at the same time. The method may comprise sending, to the wireless device, an indication that the wireless device should deactivate autonomous UL transmission.

In certain embodiments, the method may comprise determining that the wireless device should switch from scheduled-based access to autonomous UL transmission, and sending, to the wireless device, an indication that the wireless device should activate autonomous UL transmission.

In certain embodiments, one or more of the indication that the wireless device should deactivate autonomous UL transmission and the indication that the wireless device should activate autonomous UL transmission may be sent using one or more of: broadcast-type control signaling; and dedicated control signaling.

Figure 12:
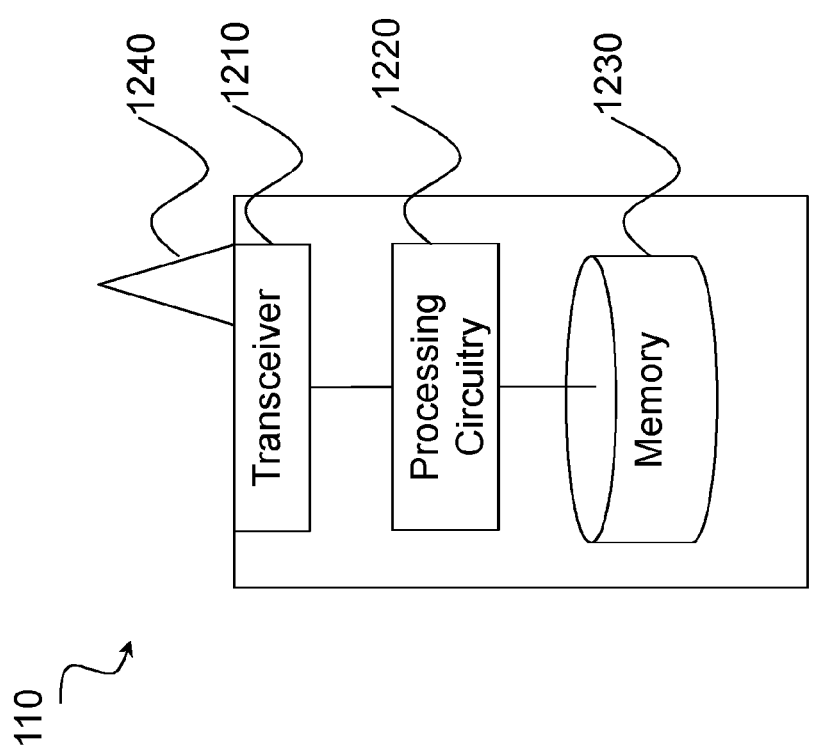
FIG. 12 is a block schematic of an exemplary wireless device, in accordance with certain embodiments.

FIG. 12 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1210, processor 1220, and memory 1230. In some embodiments, transceiver 1210 facilitates transmitting wireless signals to and receiving wireless signals from network node 115 (e.g., via antenna 1240), processor 1220 executes instructions to provide some or all of the functionality described above as being provided by wireless device 110, and memory 1230 stores the instructions executed by processor 1220.

Processor 1220 may include any suitable combination of hardware and software implemented in one or more modules to execute instructions and manipulate data to perform some or all of the described functions of wireless device 110, such as the functions of wireless device 110 described above in relation to FIGS. 1-11. In some embodiments, processor 1220 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 12 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 1220. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 13:
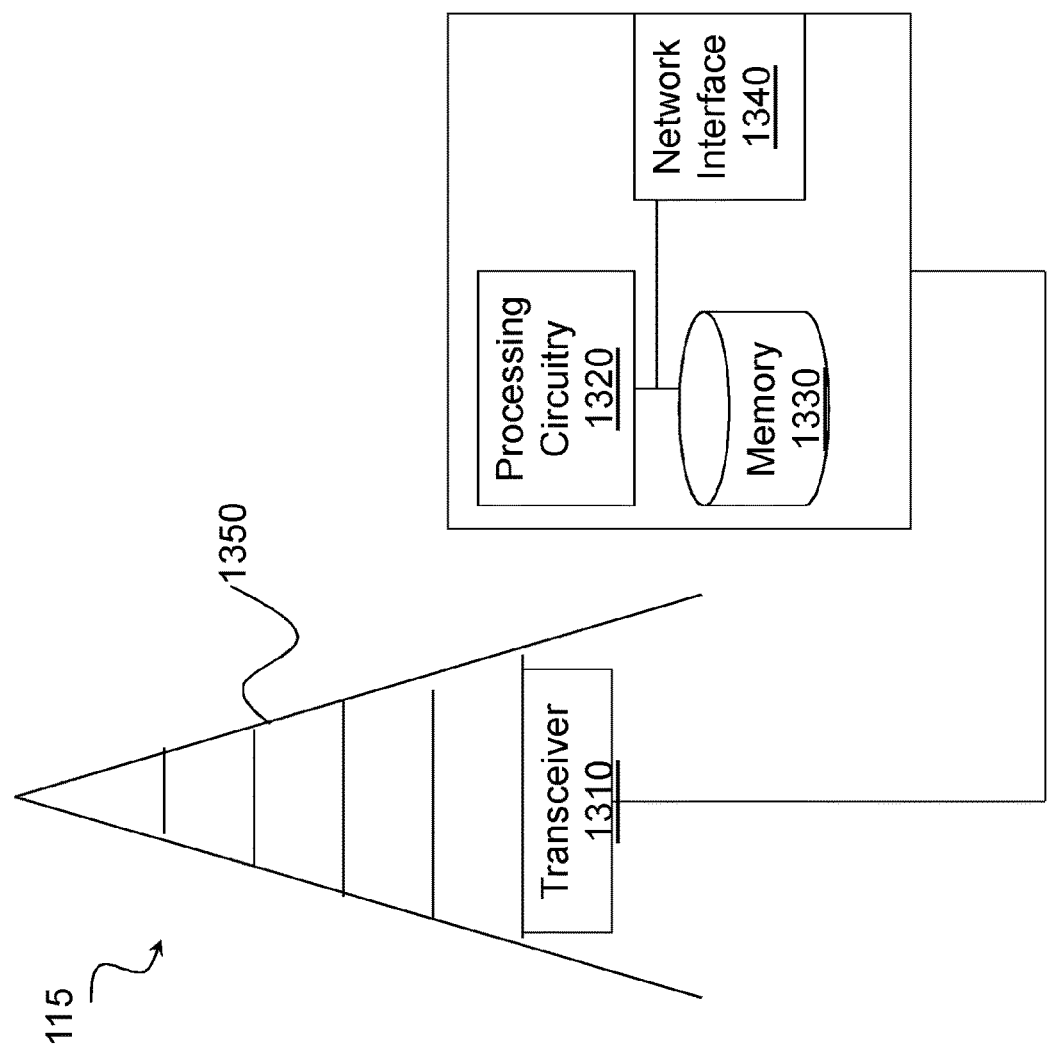
FIG. 13 is a block schematic of an exemplary network node, in accordance with certain embodiments.

FIG. 13 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1310, processor 1320, memory 1330, and network interface 1340. In some embodiments, transceiver 1310 facilitates transmitting wireless signals to and receiving wireless signals from wireless device 110 (e.g., via antenna 1350), processor 1320 executes instructions to provide some or all of the functionality described above as being provided by a network node 115, memory 1330 stores the instructions executed by processor 1320, and network interface 1340 communicates signals to backend network components, such as a gateway, switch, router, Internet, Public Switched Telephone Network (PSTN), core network nodes or radio network controllers 130, etc.

Processor 1320 may include any suitable combination of hardware and software implemented in one or more modules to execute instructions and manipulate data to perform some or all of the described functions of network node 115, such as those described above in relation to FIGS. 1-11 above. In some embodiments, processor 1320 may include, for example, one or more computers, one or more CPUs, one or more microprocessors, one or more applications, one or more ASICs, one or more FPGAs and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1340 is communicatively coupled to processor 1320 and may refer to any suitable device operable to receive input for network node 115, send output from network node 115, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of network node 115 may include additional components beyond those shown in FIG. 13 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 14:
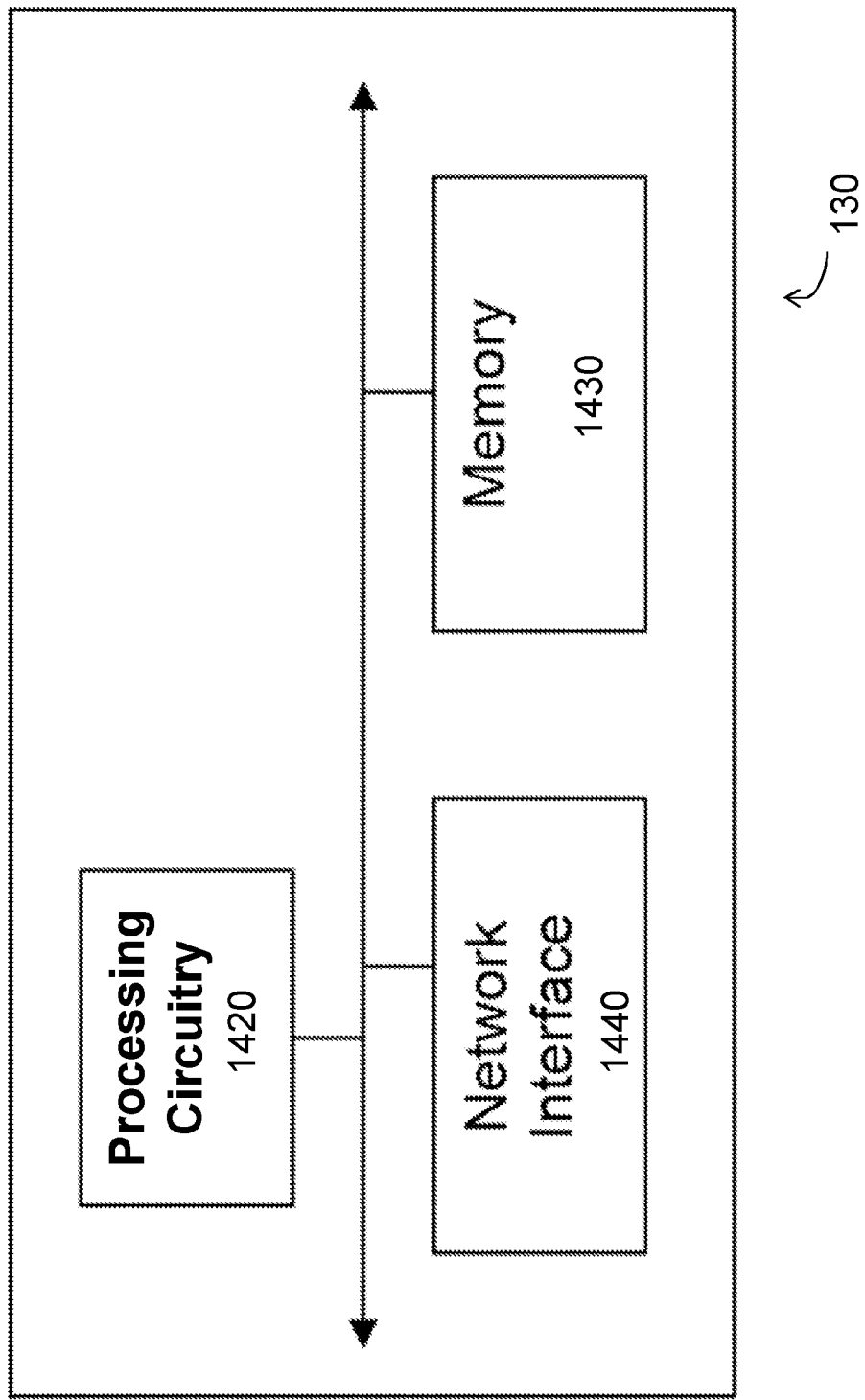
FIG. 14 is a block schematic of an exemplary radio network controller or core network node, in accordance with certain embodiments.

FIG. 14 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1420, memory 1430, and network interface 1440. In some embodiments, processor 1420 executes instructions to provide some or all of the functionality described above as being provided by the network node, memory 1430 stores the instructions executed by processor 1420, and network interface 1440 communicates signals to any suitable node, such as a gateway, switch, router, Internet, Public Switched Telephone Network (PSTN), network nodes 115, radio network controllers or core network nodes 130, etc.

Processor 1420 may include any suitable combination of hardware and software implemented in one or more modules to execute instructions and manipulate data to perform some or all of the described functions of the radio network controller or core network node 130. In some embodiments, processor 1420 may include, for example, one or more computers, one or more CPUs, one or more microprocessors, one or more applications, one or more ASICs, one or more FPGAs and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1440 is communicatively coupled to processor 1420 and may refer to any suitable device operable to receive input for the network node, send output from the network node, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

Other embodiments of the network node may include additional components beyond those shown in FIG. 14 that may be responsible for providing certain aspects of the network node's functionality, including any of the functionality described above and/or any additional functionality (including any functionality necessary to support the solution described above).

Figure 15:
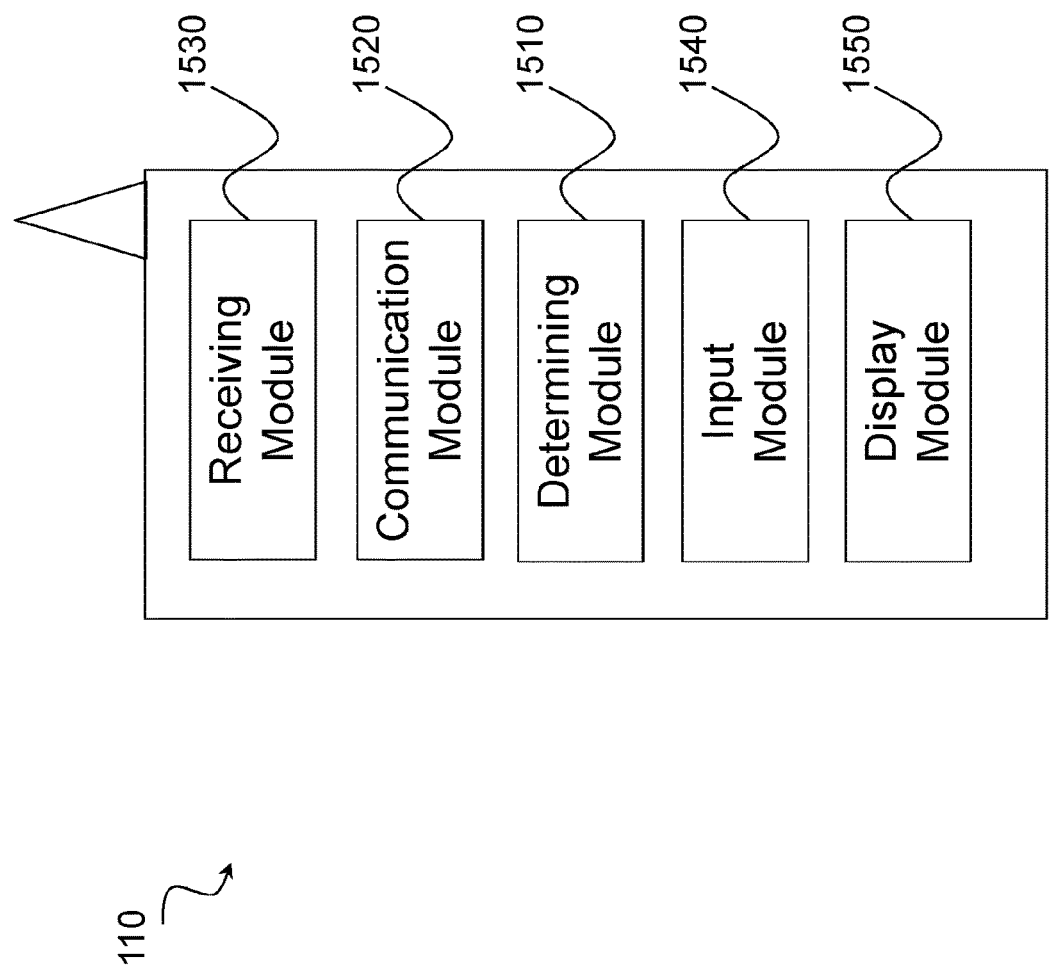
FIG. 15 is a block schematic of an exemplary wireless device, in accordance with certain embodiments.

FIG. 15 is a block schematic of an exemplary wireless device, in accordance with certain embodiments. Wireless device 110 may include one or more modules. For example, wireless device 110 may include a determining module 1510, a communication module 1520, a receiving module 1530, an input module 1540, a display module 1550, and any other suitable modules. In some embodiments, one or more of determining module 1510, communication module 1520, receiving module 1530, input module 1540, display module 1550 or any other suitable module may be implemented using one or more processors, such as processor 1220 described above in relation to FIG. 12. Wireless device 110 may perform the methods for collision avoidance adaptation for autonomous transmission systems described above with respect to FIGS. 1-11.

Determining module 1510 may perform the processing functions of wireless device 110. For example, determining module 1510 may obtain information related to a signal transmission configuration for autonomous UL transmission by the wireless device. In certain embodiments, determining module 1510 may obtain information related to the signal transmission configuration for autonomous UL transmission by wireless device 110 by autonomously determining the information related to the signal transmission configuration. Determining module 1510 may include or be included in one or more processors, such as processor 1220 described above in relation to FIG. 12. Determining module 1510 may include analog and/or digital circuitry configured to perform any of the functions of determining module 1510 and/or processor 1220 described above. The functions of determining module 1510 described above may, in certain embodiments, be performed in one or more distinct modules.

Communication module 1520 may perform the transmission functions of wireless device 110. For example, communication module 1520 may perform autonomous UL transmission according to the obtained information related to the signal transmission configuration. In certain embodiments, communication module 1520 may perform autonomous UL transmission while avoiding one or more specific subframes. Communication module 1520 may transmit messages to one or more of network nodes 115 of network 100. Communication module 1520 may include a transmitter and/or a transceiver, such as transceiver 1210 described above in relation to FIG. 12. Communication module 1520 may include circuitry configured to wirelessly transmit messages and/or signals. In particular embodiments, communication module 1520 may receive messages and/or signals for transmission from determining module 1510. In certain embodiments, the functions of communication module 1520 described above may be performed in one or more distinct modules.

Receiving module 1530 may perform the receiving functions of wireless device 110. As one example, receiving module 1530 may obtain information related to a signal transmission configuration for autonomous UL transmission by wireless device 110. In some cases, receiving module 1530 may obtain information related to the signal transmission configuration for autonomous UL transmission by receiving the information related to the signal transmission configuration from a network node. As another example, receiving module 1530 may receive an indication of a subframe pattern applicable to autonomous uplink transmission by wireless device 110. As still another example, receiving module 1530 may receive at least one of an offset value and a rotation periodicity via one or more of: a common physical downlink control channel; and higher layer signaling. As another example, receiving module 1530 may receive an indication that wireless device 110 should deactivate autonomous UL transmission. As another example, receiving module 1530 may receive one of a semi-persistent schedule deactivation command and a new semi-persistent scheduling grant. As another example, receiving module 1530 may receive an indication that wireless device 110 should activate autonomous UL activity.

Receiving module 1530 may include a receiver and/or a transceiver, such as transceiver 1210 described above in relation to FIG. 12. Receiving module 1530 may include circuitry configured to wirelessly receive messages and/or signals. In particular embodiments, receiving module 1530 may communicate received messages and/or signals to determining module 1510. The functions of receiving module 1530 described above may, in certain embodiments, be performed in one or more distinct modules.

Input module 1540 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1510.

Display module 1550 may present signals on a display of wireless device 110. Display module 1550 may include the display and/or any appropriate circuitry and hardware configured to present signals on the display. Display module 1550 may receive signals to present on the display from determining module 1510.

Determining module 1510, communication module 1520, receiving module 1530, input module 1540, and display module 1550 may include any suitable configuration of hardware and/or software. Wireless device 110 may include additional modules beyond those shown in FIG. 15 that may be responsible for providing any suitable functionality, including any of the functionality described above and/or any additional functionality (including any functionality necessary to support the various solutions described herein).

Figure 16:
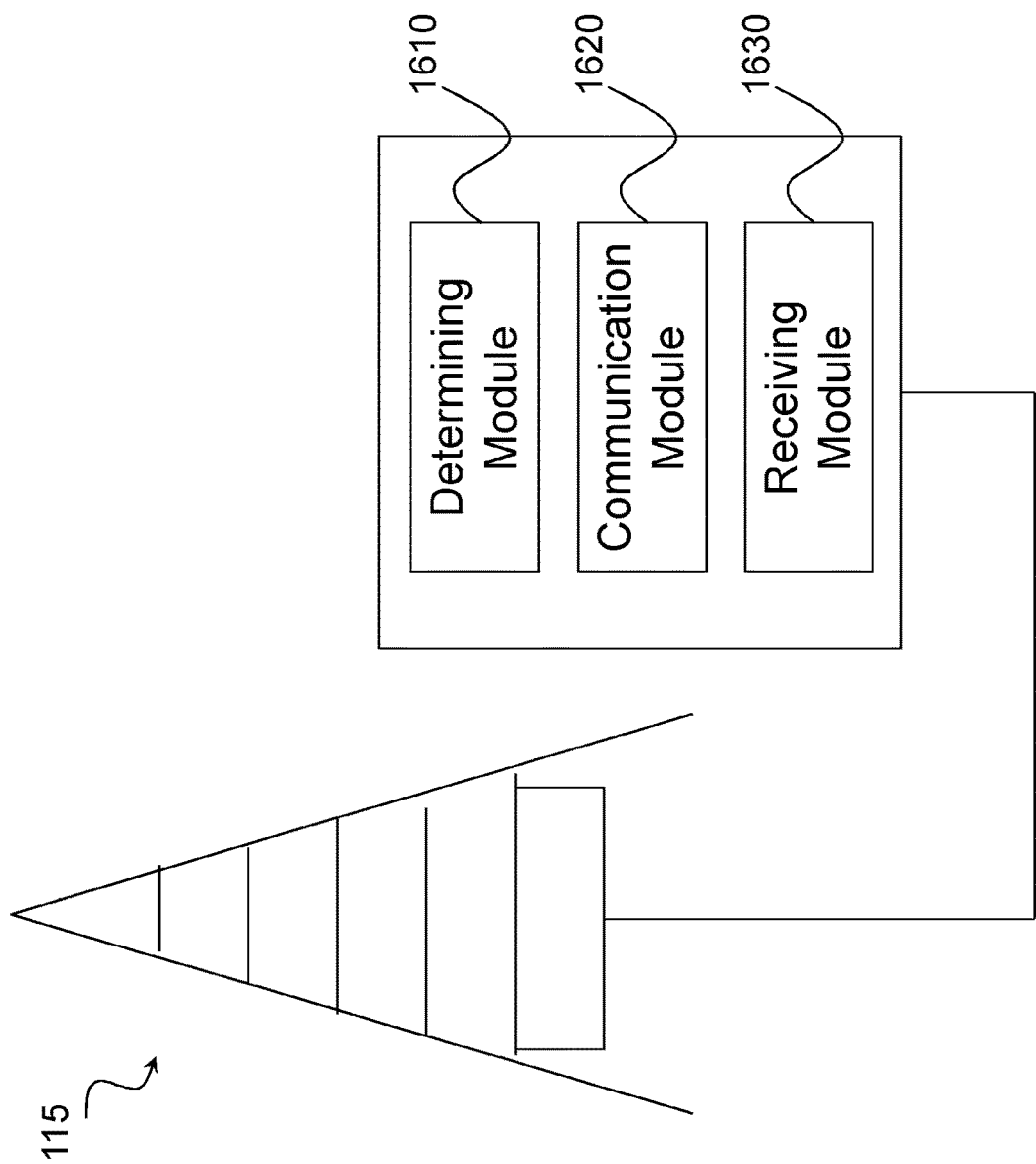
FIG. 16 is a block schematic of an exemplary network node, in accordance with certain embodiments.

FIG. 16 is a block schematic of an exemplary network node 115, in accordance with certain embodiments. Network node 115 may include one or more modules. For example, network node 115 may include determining module 1610, communication module 1620, receiving module 1630, and any other suitable modules. In some embodiments, one or more of determining module 1610, communication module 1620, receiving module 1630, or any other suitable module may be implemented using one or more processors, such as processor 1320 described above in relation to FIG. 13. In certain embodiments, the functions of two or more of the various modules may be combined into a single module. Network node 115 may perform the methods for collision avoidance adaptation for autonomous transmission systems described above with respect to FIGS. 1-11.

Determining module 1610 may perform the processing functions of network node 115. For example, determining module 1610 may determine information related to a signal transmission configuration for autonomous UL transmission by a wireless device. As another example, determining module 1610 may configure the wireless device to perform autonomous UL transmission according to the determined information related to the signal transmission configuration. As another example, determining module 1610 may determine, based on one or more criteria, that the wireless device should deactivate autonomous UL transmission and switch to schedule-based access. As still another example, determining module 1610 may determine that the wireless device should switch from scheduled-based access to autonomous UL transmission.

As another example, determining module 1610 may determine a network load. As yet another example, determining module 1610 may determine whether a wireless device has data in an UL buffer. As still another example, determining module 1610 may determine whether to suspend autonomous UL transmission for a particular one of the one or more wireless devices. As another example, determining module 1610 may monitor collisions on a channel where one or more wireless devices attempt to access the channel at the same time by detecting DMRS transmissions from the one or more wireless devices, determining whether a fraction of resources where multiple DMRS transmissions are detected exceeds a threshold, and performing one or more of: suspending autonomous UL transmission for one or more wireless devices; reducing a number of resources available for autonomous UL transmission; and shifting some of the one or more wireless devices to scheduled UL access. As yet another example, determining module 1610 may determine whether a time duration since the network node last received an UL transmission from a particular wireless device exceeds a threshold. Upon determining that the time duration exceeds the threshold, determining module 1610 may perform one or more of: dedicate one or more resources to the particular wireless device without overbooking the same resources to other wireless devices; and release SPS resources for the particular wireless device. As another example, determining module 1610 may monitor a fraction of UL resources for which collisions occur. As still another example, determining module 1610 may determine that one or more wireless devices configured to use schedule-based access in the UL should be switched to unscheduled access.

Determining module 1610 may include or be included in one or more processors, such as processor 1320 described above in relation to FIG. 13. Determining module 1610 may include analog and/or digital circuitry configured to perform any of the functions of determining module 1610 and/or processor 1320 described above. The functions of determining module 1610 may, in certain embodiments, be performed in one or more distinct modules.

Communication module 1620 may perform the transmission functions of network node 115. As one example, communication module 1620 may send the determined information related to the signal transmission configuration to the wireless device. As another example, communication module 1620 may send an indication of a subframe pattern applicable to autonomous UL transmission by the wireless device. As still another example, communication module 1620 may send at least one of an offset value and a rotation periodicity to the wireless device via one or more of: a common physical downlink control channel; and higher layer signaling. As another example, communication module 1620 may send, to the wireless device, an indication that the wireless device should deactivate autonomous UL transmission. As another example, communication module 1620 may send, to the wireless device, an indication that the wireless device should activate autonomous UL transmission. As another example, communication module 1620 may send, to the one or more UEs, an indication that the one or more wireless devices should suspend autonomous UL transmission. As still another example, communication module 1620 may send one of a semi-persistent scheduling deactivation command and a new semi-persistent scheduling grant.

Communication module 1620 may transmit messages to one or more of wireless devices 110. Communication module 1620 may include a transmitter and/or a transceiver, such as transceiver 1310 described above in relation to FIG. 13. Communication module 1620 may include circuitry configured to wirelessly transmit messages and/or signals. In particular embodiments, communication module 1620 may receive messages and/or signals for transmission from determining module 1610 or any other module. The functions of communication module 1620 may, in certain embodiments, be performed in one or more distinct modules.

Receiving module 1630 may perform the receiving functions of network node 115. For example, receiving module 1630 may receive feedback from one or more wireless devices about semi-persistent scheduling resources assigned to the one or more wireless devices. As another example, receiving module 1630 may receive a request from a particular one of the one or more wireless devices requesting that the network node suspend autonomous UL transmission. Receiving module 1630 may receive any suitable information from a wireless device. Receiving module 1630 may include a receiver and/or a transceiver, such as transceiver 1310 described above in relation to FIG. 13. Receiving module 1630 may include circuitry configured to wirelessly receive messages and/or signals. In particular embodiments, receiving module 1630 may communicate received messages and/or signals to determining module 1610 or any other suitable module. The functions of receiving module 1630 may, in certain embodiments, be performed in one or more distinct modules.

Determining module 1610, communication module 1620, and receiving module 1630 may include any suitable configuration of hardware and/or software. Network node 115 may include additional modules beyond those shown in FIG. 16 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3 GPP $3^{rd}$ Generation Partnership Project
ACK Acknowledgement
AP Access Point
ASIC Application Specific Integrated Circuit
BO Backoff
BS Base Station
BSC Base Station Controller
BSR Buffer Status Report
BTS Base Transceiver Station
CA Carrier Aggregation
CCA Clear Channel Assessment
CD Compact Disk
CE Control Element
CFI Control Format Indicator
CPDCCH Common Physical Downlink Control Channel
CPE Customer Premises Equipment
CPU Central Processing Unit
CRC Cyclic Redundancy Check
C-RNTI Cell Radio Network Temporary Identifier
CRS Cell-Specific Reference Symbols
CSI-RS Channel State Information Reference Signal
CSMA/CA Carrier Sense Multiple Access with Collision Avoidance
D2D Device-to-device
DAS Distributed Antenna System
DCI Downlink Control Information
DIFS Distributed Inter-Frame Space
DL Downlink
DMRS Demodulation Reference Signals
DMTC DRS Measurement Time Configuration
DRS Discovery Reference Signal
DVD Digital Video Disk
eNB evolved Node B
EPDCCH Enhanced Physical Downlink Control Channel
E-SMLC Evolved Serving Mobile Location Center
ETSI European Telecommunications Standards Institute
E-UTRAN Evolved Universal Terrestrial Radio Access Network
FPGA Field Programmable Gate Array
IoT Internet of Things
IP Internet Protocol
IUA Instant Uplink Access
LAA Licensed-Assisted Access
LAN Local Area Network
LB T Listen-Before-Talk
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation level and coding scheme
MDT Minimization of Drive Test
MME Mobility Management Entity
MSC Mobile Switching Center
MSR Multi-standard Radio
MTC Machine-Type Communication
NACK Negative Acknowledgement
NAS Non-Access Stratum NB-IoT Narrow band Internet of Things
NR New Radio
O&M Operations and Management
OFDM Orthogonal Frequency Division Multiplexing
OSS Operations Support System
PCell Primary Cell
PDCCH Physical Downlink Control Channel
PSS Primary Synchronization Signal
PSTN Public Switched Telephone Network
PUCCH Physical Uplink Control Channel
PUSCH Physical Uplink Shared Channel
RA Random Access
RAM Random Access Memory
RAN Radio Access Network
RAT Radio Access Technology
RNC Radio Network Controller
ROM Read-Only Memory
RRC Radio Resource Control
RRH Remote Radio Head
RRM Radio Resource Management
RRU Remote Radio Unit
SCell Secondary Cell
SC-FDMA Single-Carrier Frequency Division Multiple Access
SIB Session Information Block
SINR Signal to Interference plus Noise Ratio
SON Self-Organizing Network
SPS Semi-Persistent Scheduling
SR Scheduling Request
SRS Sounding Reference Signal
SSS Secondary Synchronization Signal
TDMA Time Division Multiple Access
TR Technical Report
TS Technical Specification
TTI Transmission Time Interval
UE User Equipment
UL Uplink
UP User Plane
WAN Wide Area Network
WLAN Wireless Local Area Network

The invention claimed is:

1. A method in a wireless device, comprising:
obtaining information related to a signal transmission configuration for autonomous uplink transmission by the wireless device, the information comprising:
a set of pre-allocated resources for use by the wireless device in performing autonomous uplink transmission on a cell established between the wireless device and a network node, wherein the set of pre-allocated resources have a periodicity; and
performing autonomous uplink transmission according to the obtained information related to the signal transmission configuration.

2. The method of claim 1, wherein obtaining information related to the signal transmission configuration for autonomous uplink transmission by the wireless device comprises:
receiving an indication of a subframe pattern applicable to autonomous uplink transmission by the wireless device.

3. The method of claim 1, wherein the indication of the subframe pattern is a bitmap.

4. The method of claim 1, wherein the information related to the signal transmission configuration for autonomous uplink transmission by the wireless device comprises one or more of:
an offset value for determining a length of a sensing duration to be used by the wireless device before a next allowed transmission period; and
a rotation periodicity.

5. The method of claim 1, comprising receiving at least one of the offset value and the rotation periodicity via one or more of:
a common physical downlink control channel; and
higher layer signaling.

6. The method of claim 1, wherein the offset value corresponds to a priority level of the wireless device for performing autonomous uplink transmissions.

7. The method of claim 1, comprising:
receiving an indication that the wireless device should deactivate autonomous uplink transmission, wherein the indication that the wireless device should deactivate autonomous uplink transmission is received over one or more of:
broadcast-type control signaling; and
dedicated control signaling.

8. The method of claim 1, further comprising:
switching from an autonomous uplink transmission mode to a network-node controlled scheduling mode.

9. The method of claim 8, wherein the switching is performed dynamically based on load.

10. A method in a network node, comprising:
determining information related to a signal transmission configuration for autonomous uplink transmission by a wireless device, the information comprising:
a set of pre-allocated resources for use by the wireless device in performing autonomous uplink transmission on a cell established between the network node and the wireless device, wherein the set of pre-allocated resources have a periodicity; and
configuring the wireless device to perform autonomous uplink transmission according to the determined information related to the signal transmission configuration.

11. The method of claim 10, wherein configuring the wireless device to perform autonomous uplink transmission according to the determined information related to the signal transmission configuration comprises:
sending an indication of a subframe pattern applicable to autonomous uplink transmission by the wireless device wherein the indication of the subframe pattern is a bitmap.

12. The method of claim 10, wherein the information related to the signal transmission configuration for autonomous uplink transmission by the wireless device comprises one or more of:
an offset value for determining a length of a sensing duration to be used by the wireless device before a next allowed transmission period; and
a rotation periodicity.

13. The method of claim 10, comprising sending at least one of the offset value and the rotation periodicity to the wireless device via one or more of:
a common physical downlink control channel; and
higher layer signaling.

14. The method of claim 10, wherein the offset value corresponds to a priority level of the wireless device for performing autonomous uplink transmissions.

15. The method of claim 10, comprising:
determining, based on one or more criteria, that the wireless device should deactivate autonomous uplink transmission and switch to schedule-based access, wherein the one or more criteria comprise one or more of:

a buffer status at the network node;
a traffic type;
a buffer build-up;
a cleanliness of the channel;
a number of UEs with non-empty UL buffer;
a NACK to ACK ratio for one or more wireless devices; and
a number of collisions on a channel where multiple wireless devices attempt to access the channel at the same time; and
sending, to the wireless device, an indication that the wireless device should deactivate autonomous uplink transmission.

16. The method of claim 10, wherein the indication that the wireless device should deactivate autonomous uplink transmission is sent using one or more of:
broadcast-type control signaling; and
dedicated control signaling.

17. The method of claim 10, further comprising:
configuring the wireless device to switch from an autonomous uplink transmission mode to a network-node controlled scheduling mode.

18. The method of claim 17, wherein the switching is performed dynamically based on load.

19. A wireless device, comprising:
processing circuitry, the processing circuitry configured to:
obtain information related to a signal transmission configuration for autonomous uplink transmission by the wireless device, the information comprising:
a set of pre-allocated resources for use by the wireless device in performing autonomous uplink transmission on a cell established between the wireless device and a network node, wherein the set of pre-allocated resources have a periodicity; and
perform autonomous uplink transmission according to the obtained information related to the signal transmission configuration.

20. A network node, comprising:
processing circuitry, the processing circuitry configured to:
determine information related to a signal transmission configuration for autonomous uplink transmission by a wireless device, the information comprising:
a set of pre-allocated resources for use by the wireless device in performing autonomous uplink transmission on a cell established between the network node and the wireless device, wherein the set of pre-allocated resources have a periodicity; and
configure the wireless device to perform autonomous uplink transmission according to the determined information related to the signal transmission configuration.

* * * * *

UNITED STATES PATENT AND TRADEMARK OFFICE
CERTIFICATE OF CORRECTION

PATENT NO. : 12,279,198 B2  
APPLICATION NO. : 18/502186  
DATED : April 15, 2025  
INVENTOR(S) : Karaki et al.

Page 1 of 1

It is certified that error appears in the above-identified patent and that said Letters Patent is hereby corrected as shown below:

On the Title Page

In Column 1, below "Related U.S. Application Data", delete Item "(60)" and insert Item -- (63) --, therefor.

In the Specification

In Column 28, Lines 19-20, delete "remote RF unit (RRU)," and insert -- remote radio unit (RRU), --, therefor.

In Column 34, Line 8, delete "3 GPP" and insert -- 3GPP --, therefor.

In Column 34, Line 52, delete "LB T" and insert -- LBT --, therefor.

Signed and Sealed this  
Twenty-third Day of December, 2025

John A. Squires  
*Director of the United States Patent and Trademark Office*